United States Patent
McCaslin et al.

(10) Patent No.: US 7,757,379 B1
(45) Date of Patent: Jul. 20, 2010

(54) METHOD FOR OPERATING A DISK DRIVE APPARATUS EMPLOYING A SUSPENSION HAVING A VERTICAL OFFSET TO REDUCE TRACK MIS-REGISTRATION

(75) Inventors: Martin John McCaslin, Pleasanton, CA (US); Khampon Sittipongpanich, Bangkok (TH); Sitthipong Footrakul, Nontaburi (TH); Visit Thaveeprungsriporn, Bangkok (TH)

(73) Assignee: Magnecomp Corporation, Murietta, CA (US)

( * ) Notice: Subject to any disclaimer, the term of this patent is extended or adjusted under 35 U.S.C. 154(b) by 8 days.

(21) Appl. No.: 12/183,742

(22) Filed: Jul. 31, 2008

Related U.S. Application Data

(60) Division of application No. 11/119,363, filed on Apr. 29, 2005, now Pat. No. 7,408,743, which is a continuation of application No. 10/943,804, filed on Sep. 16, 2004, now abandoned.

(60) Provisional application No. 60/504,081, filed on Sep. 19, 2003.

(51) Int. Cl.
  G11B 5/127 (2006.01)
  H04R 31/00 (2006.01)

(52) U.S. Cl. ............ 29/603.03; 29/603.04; 29/603.06; 29/603.07; 29/603.1; 29/727; 360/234.5; 360/245.8

(58) Field of Classification Search ............ 29/603.03, 29/603.04, 603.06, 603.07, 603.1; 360/234.5; 360/245.8
See application file for complete search history.

(56) References Cited

U.S. PATENT DOCUMENTS

| 4,175,275 | A | 11/1979 | Schaefer |
| 4,208,684 | A | 6/1980 | Janssen et al. |
| 5,734,525 | A | 3/1998 | Girard |
| 5,999,369 | A | 12/1999 | Shimizu et al. |
| 6,088,192 | A | 7/2000 | Riener et al. |
| 6,344,954 | B1 * | 2/2002 | Redon et al. ............. 360/324.2 |
| 6,385,013 | B1 * | 5/2002 | Sato ....................... 360/237.1 |
| 6,721,133 | B2 | 4/2004 | Takagi et al. |
| 6,768,613 | B1 | 7/2004 | Coon |
| 6,778,362 | B1 | 8/2004 | Davis et al. |

(Continued)

OTHER PUBLICATIONS

Relevant portions of file history of U.S. Appl. No. 11/119,363 (claims, office actions, amendments and arguments, notice of allowance), 2005.

(Continued)

*Primary Examiner*—Paul D Kim
(74) *Attorney, Agent, or Firm*—Intellectual Property Law Offices of Joel Voelzke, APC

(57) ABSTRACT

A suspension assembly for a hard disk drive includes at least two spring extensions that couple to a proximal portion of a load beam. These spring extensions are disposed by a vertical offset and couple to the load beam on opposite sides of a longitudinal axis of the load beam. The method for operating a disk drive apparatus includes following by a suspension assembly from a reference position to a second position a vertical movement of a rotating disk. The suspension assembly is predisposed to move from the reference position to the second position by the vertical offset. A read/write head coupled to the suspension assembly is in closer alignment to a selected track during the vertical movement in the second position than if the first and second spring extensions were disposed to be co-planar.

15 Claims, 19 Drawing Sheets

U.S. PATENT DOCUMENTS

| | | |
|---|---|---|
| 6,934,125 B2 | 8/2005 | Takagi et al. |
| 6,967,800 B1 | 11/2005 | Chen et al. |
| 7,068,470 B1 | 6/2006 | Hadian et al. |
| 7,113,371 B1 | 9/2006 | Hanna et al. |
| 7,280,316 B1 | 10/2007 | McCaslin et al. |
| 2001/0008475 A1 | 7/2001 | Takagi et al. |
| 2002/0051319 A1 | 5/2002 | Takagi et al. |
| 2002/0085314 A1 | 7/2002 | Williams |
| 2002/0131211 A1 | 9/2002 | Nishida et al. |
| 2005/0007689 A1 | 1/2005 | Oh et al. |
| 2005/0007701 A1 | 1/2005 | Oh et al. |
| 2005/0007702 A1 | 1/2005 | Oh et al. |
| 2007/0115590 A1 | 5/2007 | Resh et al. |

OTHER PUBLICATIONS

Relevant portions of file history of U.S. Appl. No. 11/119,364 (claims, office actions, amendments and arguments, notice of allowance), 2005.

Relevant portions of file history of U.S. Appl. No. 11/292,889 (claims, office actions, amendments and arguments, notice of allowance), 2005.

* cited by examiner

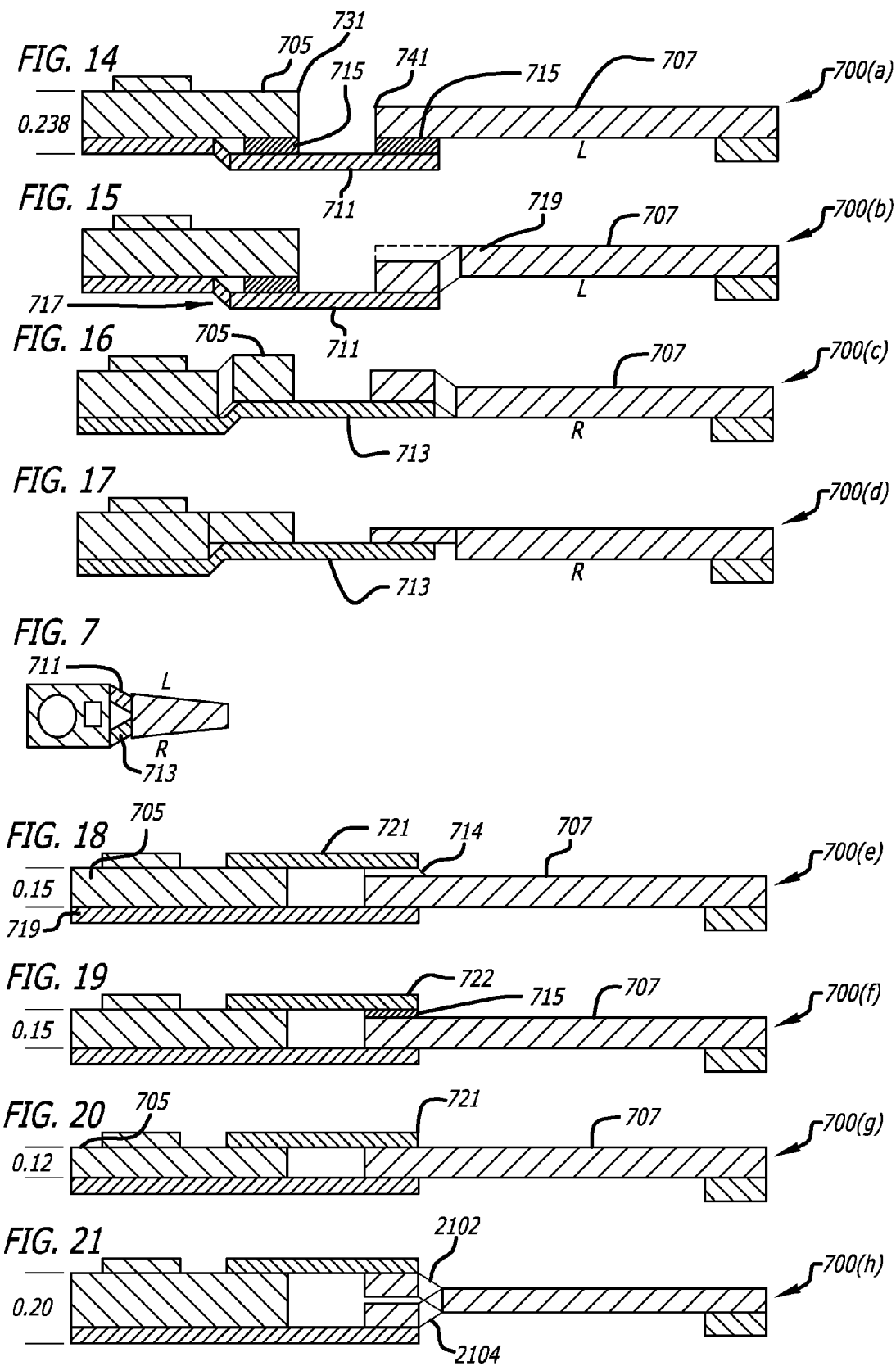

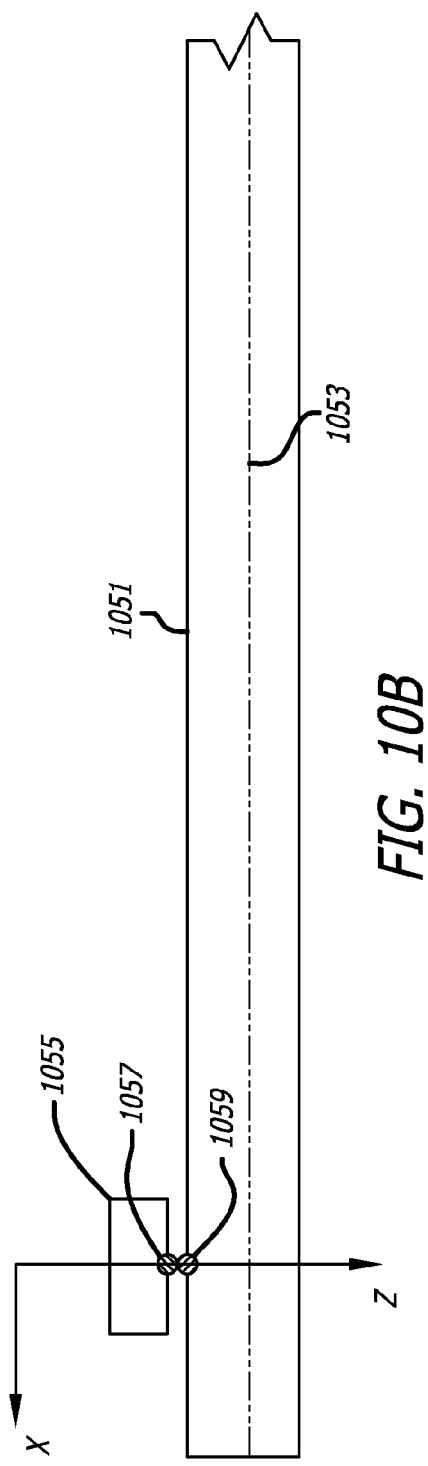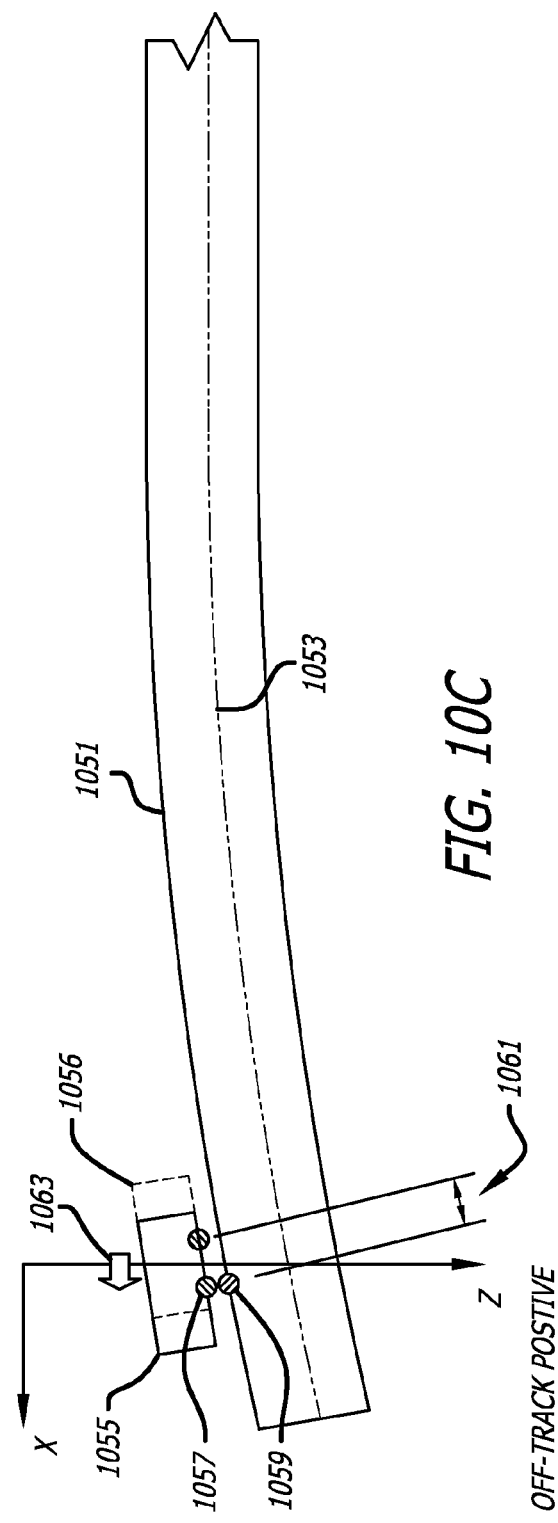

METHOD FOR OPERATING A DISK DRIVE APPARATUS EMPLOYING A SUSPENSION HAVING A VERTICAL OFFSET TO REDUCE TRACK MIS-REGISTRATION

CROSS-REFERENCES TO RELATED APPLICATIONS

This application is a divisional of U.S. application Ser. No. 11/119,363 filed Apr. 29, 2005, now U.S. Pat. No. 7,408,743, which is a continuation of U.S. application Ser. No. 10/943, 804 (abandoned) filed Sep. 16, 2004, which claims priority from U.S. provisional patent application No. 60/504,081 filed Sep. 19, 2003, which disclosures are incorporated herein by reference in their entireties.

This application could also be considered to be related to U.S. application Ser. No. 11/292,889 filed Dec. 2, 2005, now U.S. Pat. No. 7,502,203, which is a continuation of U.S. application Ser. No. 11/119,363 filed Apr. 29, 2005, now U.S. Pat. No. 7,408,743.

This application could also be considered to be related to U.S. application Ser. No. 11/119,364 filed Apr. 29, 2005, now U.S. Pat. No. 7,280,316, which is a continuation of U.S. application Ser. No. 11/058,844 (abandoned) filed Feb. 15, 2005, which is a continuation-in-part of application Ser. No. 10/943,804 (abandoned) filed Sep. 16, 2004.

BACKGROUND OF THE INVENTION

The present invention generally relates to techniques for operating a disk drive apparatus. More particularly, the present invention provides techniques for reading and writing information onto a hard disk drive that compensate for flow induced vibrations, commonly called disk flutter. Merely by way of example, the present invention is implemented using vertically offset spring extensions (or hinges) in a head suspension assembly, but it would be recognized that the invention has a much broader range of applicability.

A hard disc drive (HDD) unit generally uses a spinning storage medium (e.g., a disk or platter) to store data. A read-write head is positioned in close proximity to the spinning storage medium by a Head Stack Assembly (HSA). Mounted on the HSA, a suspension assembly commonly includes a base plate, a load beam, and a flexure trace gimbal to which a slider is mounted. The slider supports the read-write head element. The load beam is generally composed of an actuator mounting section, a spring region, and a rigid region. The spring region gives the suspension a spring force or preload counteracting the aerodynamic lift force created by the spinning medium during reading or writing. A gimbal is mounted at the distal end of the load beam and supports the slider allowing the head to have pitch and roll movement in order to follow the irregularities of the disk surface.

Demand generally requires increased HDD storage capacity, which generally compels higher data track densities for the storage medium. Furthermore, the demand for faster rates of data seeking and accessing also leads to higher rotational speeds. A significant obstacle associated with increasing rotational speeds and storage capacity is often head positioning accuracy as the head flies above the spinning storage medium.

A significant obstacle to head positioning accuracy is disk flutter. Disk flutter is an aero-elastic instability induced by the coupling of the spinning storage medium and the air surrounding the media resulting in disk vibration modes. These flow induced vibrations can physically cause an off-track misalignment of the head to the desired track resulting in failure to access or write data on the right track. Problems associated with disk flutter become more intolerable with higher track densities and disk rotation speeds.

Accordingly, novel solutions for operating hard disk drives to substantially reduce off-track misalignment induced by disk flutter are needed.

BRIEF SUMMARY OF THE INVENTION

Techniques for operating a disk drive apparatus are provided. More particularly, the present invention provides a method and apparatus for reading and writing information onto a hard disk drive that compensate for flow induced vibrations. Merely by way of example, the present invention is implemented using such method and apparatus with a vertical offset between at least two spring extensions (or hinges) coupling an actuator mounting portion to a rigid support member (or load beam). The vertical offset between spring extensions (or hinges) results in an effective hinge predisposed to move in a predetermined direction.

According to an embodiment of the present invention, a method for operating a disk drive apparatus includes following by a suspension assembly from a reference position to a second position a vertical movement of a rotating disk. The suspension assembly is predisposed to move from the reference position to the second position by a vertical offset between a first and second spring extensions of the suspension assembly. A read/write head coupled to the suspension assembly is in closer alignment to a selected track during the vertical movement in the second position than if the first and second spring extensions are substantially co-planar (e.g., insignificant or no vertical offset).

According to another embodiment of the present invention, a suspension assembly for a hard disk drive includes a hinge member and a support member. The hinge member includes a first spring extension and a second spring extension, each spring extension extending in a longitudinal direction. The first spring extension is disposed by a vertical offset from the second spring extension. The support member has a first end and a second end. The first and second ends define between them a length in the longitudinal direction. The spring extensions couple to the support member on opposite sides of a longitudinal axis of the support member at about the second end.

According to yet another embodiment of the present invention, a hard disk apparatus is provided. A voice coil motor couples to a support member by an arm member and a hinge member. The hinge member includes a first spring extension and a second spring extension, which are disposed by an offset in a first direction. The first direction is defined as being perpendicular to a rotating platter underlying or overlying the support member. The extensions couple to the support member at about a first end of the support member on opposite sides of a longitudinal axis. At about a second end of the support member, the support member couples to a gimbal, and the gimbal couples to a read/write head.

According to an embodiment of the present invention, another method for operating a disk drive apparatus is provided. A read/write head is applied onto a disk to read a selected track in a periphery region of the disk. The disk is rotated about a fixed axis, the rotating disk having at least one vibration mode to move the periphery region of the disk outside an x-y plane. The read/write head is hinged to travel at an angle to the x-y plane as the periphery region moves outside the x-y plane. Movement of the read/write head along the angle when the periphery region is outside the x-y plane reduces a length in an x-direction between the selected track and the read/write head.

Many benefits are achieved by way of the present invention over conventional techniques. For example, the present technique provides an easy to use process that relies upon conventional technology. Additionally, the present invention uses a novel technique to compensate for disk vibrations, thereby reducing track mis-registration. Depending upon the embodiment, one or more of these benefits may be achieved. These and other benefits will be described in more throughout the present specification and more particularly below.

Various additional objects, features, and advantages of the present invention can be more fully appreciated with reference to the detailed description and accompanying drawings that follow.

BRIEF DESCRIPTION OF THE DRAWINGS

FIG. 7 is a simplified view of a suspension assembly according to an embodiment of the present invention.

FIGS. 10B and 10C illustrate operation of a disk drive unit according to an embodiment of the present invention;

FIG. 14 is a simplified view of an embodiment of the present invention having a vertical offset between two spring extensions, using two spacers on opposite sides of the gap between the load beam and the base plate;

FIG. 15 is a simplified view of an embodiment of the present invention having a vertical offset between two spring extensions, using one spacer and one step in the load beam;

FIG. 16 is a simplified view of an embodiment of the present invention having a vertical offset between two spring extensions, using one step in the base plate and one step in the load beam;

FIG. 17 is a simplified view of an embodiment of the present invention having a vertical offset between two spring extensions, and having a thinner portion of the base plate along the gap where the spring extension is coupled thereto;

FIG. 18 is a simplified view of an embodiment of the present invention having a vertical offset between the hinges, with the vertical offset created by forming a portion of the load beam up toward one of the hinges;

FIG. 19 is a simplified view of an embodiment of the present invention in which the vertical offset is created by a spacer between one of the spring extensions and the load beam;

FIG. 20 is a simplified view of an embodiment of the present invention in which the vertical offset is created by coupling the two hinges to opposite sides of the load beams;

FIG. 21 is a simplified view of an embodiment of the present invention in which the load beam has two vertically disposed portions for coupling the spring extensions;

DETAILED DESCRIPTION OF THE INVENTION

Techniques for operating a disk drive apparatus are provided. More particularly, the present invention provides a method and apparatus for reading and writing information onto a hard disk drive that compensate for flow induced vibrations.

Figure 1:
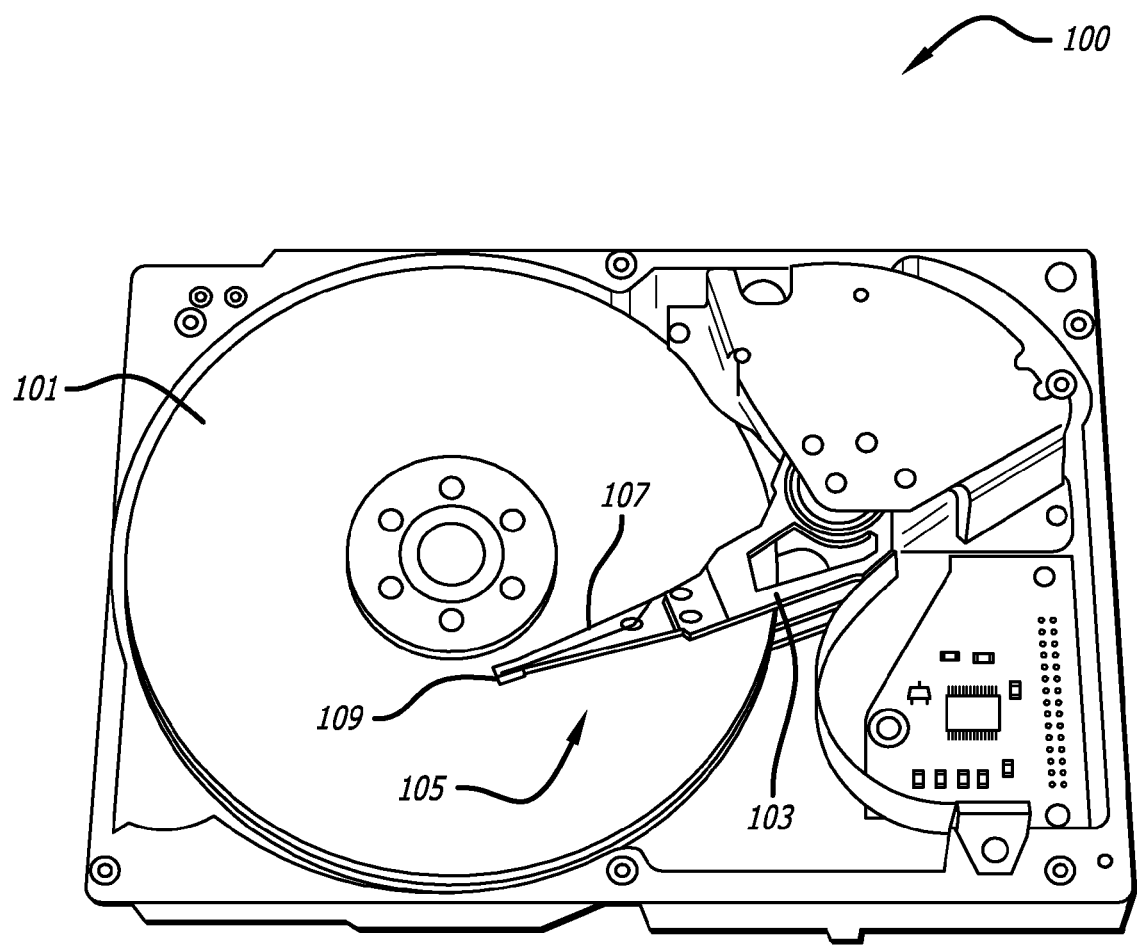
FIG. 1 is a simplified diagram of a disk drive apparatus according to an embodiment of the present invention.

FIG. 1 is a simplified diagram of a disk drive apparatus 100 according to an embodiment of the present invention. Apparatus 100 includes at least one disk 101 (e.g., one, two, three, or more disks), at least one actuator arm 103 (e.g., one, two, three, or more actuator arms), and at least one suspension assembly 105 (e.g., one, two, three, or more suspension assemblies). Each suspension assembly is composed of a load beam 107 and a flexure trace gimbal assembly 109. The suspension assembly, with trace gimbal assembly and read/write head, may be referred to as a Head Gimbal Assembly (HGA). This diagram, as well as other diagrams provided herein, is merely an example, which should not unduly limit the scope of the claims herein. One of ordinary skill in the art would recognize many other variations, modifications, and alternatives.

Disk 101, commonly called a platter, rotates about a fixed axis (or spindle) from about 5,000 rpm up to about 15,000 rpm depending upon the embodiment. Disk 101 stores information and thus often includes a magnetic medium such as a ferromagnetic material. But, it can also include optical materials, common coated on surfaces of the disk, which become active regions for storing digital bit information.

The aggregate storage capacity of disk 101 will vary with track density and disk diameter. Disk 101 stores information in tracks which can be in a range of about 50,000 tracks per inch (TPI) to about 200,000 TPI, or more. The diameter of disk 101 can be 5.12 inches (e.g., for a 5.25 inch drive), 3.74 inches (e.g., for a 3.5 inch drive), or less than 2.5 inches, or even less than 1.8 inches or 1.0 inch.

Suspension assembly 105, which overlies (or underlies) a surface of disk 101, operates and controls a slider coupled to a read/write head (not shown). Flexure trace gimbal assembly 109 is attached to suspension assembly 105 which is in turn is connected to actuator arm 103. Actuator arm 103 is connected to a voice coil motor or VCM, which moves suspension assembly 105 about a pivot point in an annular manner. The VCM can move at frequencies from DC up to about 1 kHz. Preferably, for higher track density, e.g., 200,000 TPI, the control bandwidth can approach 5 kHz, but can also be greater in certain embodiments.

Figure 2A:
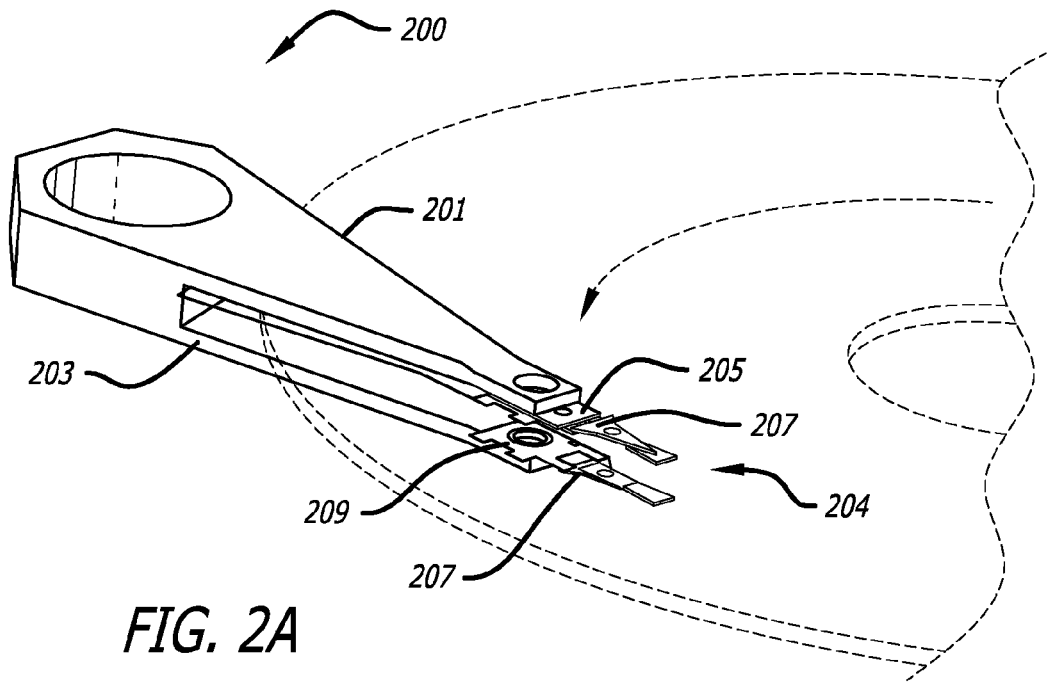
FIGS. 2A and 2B are simplified views of an actuator arm assembly according to an embodiment of the present invention.
Figure 2B:
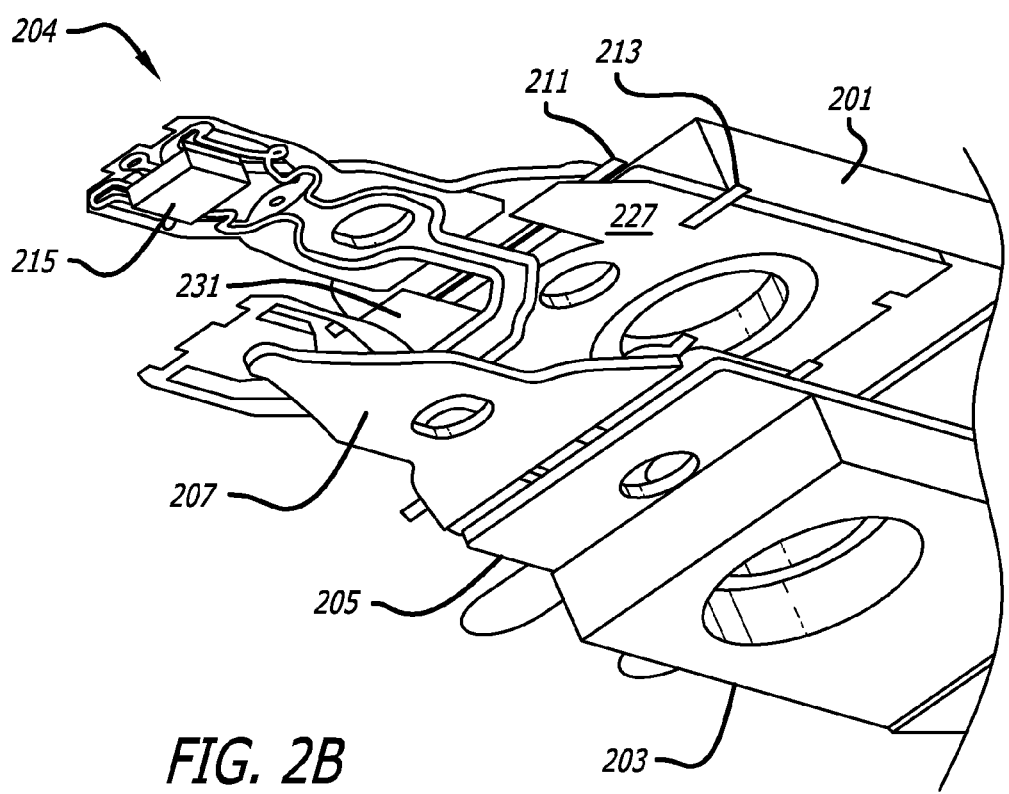

FIGS. 2A and 2B are simplified views of an actuator arm assembly 200 according to an embodiment of the present invention. These diagrams are merely examples, which should not unduly limit the scope of the claims herein. One of ordinary skill in the art would recognize other variations, modifications, and alternatives. Assembly 200 can include one, two, three, or more actuator arms. In this embodiment, actuator arm assembly 200 includes actuator arms 201 and 203. At a distal portion of each actuator arm 201 and 203, base plates 205 (or mounting plates) connect a load beam 207 to each actuator arm via hinge members 209, which can be constructed with a proximal portion providing for actuator coupling (via a base plate or, alternatively, directly to an actuator arm), and spring extensions 227 and 231 of hinge member 209 providing the needed spring relationship between the load beam and the actuator arm. Each hinge member 209 can be comprised of a springing metal layer, or any other material providing a suitable spring relationship between the load beam and the actuator arm.

Figure 2C:
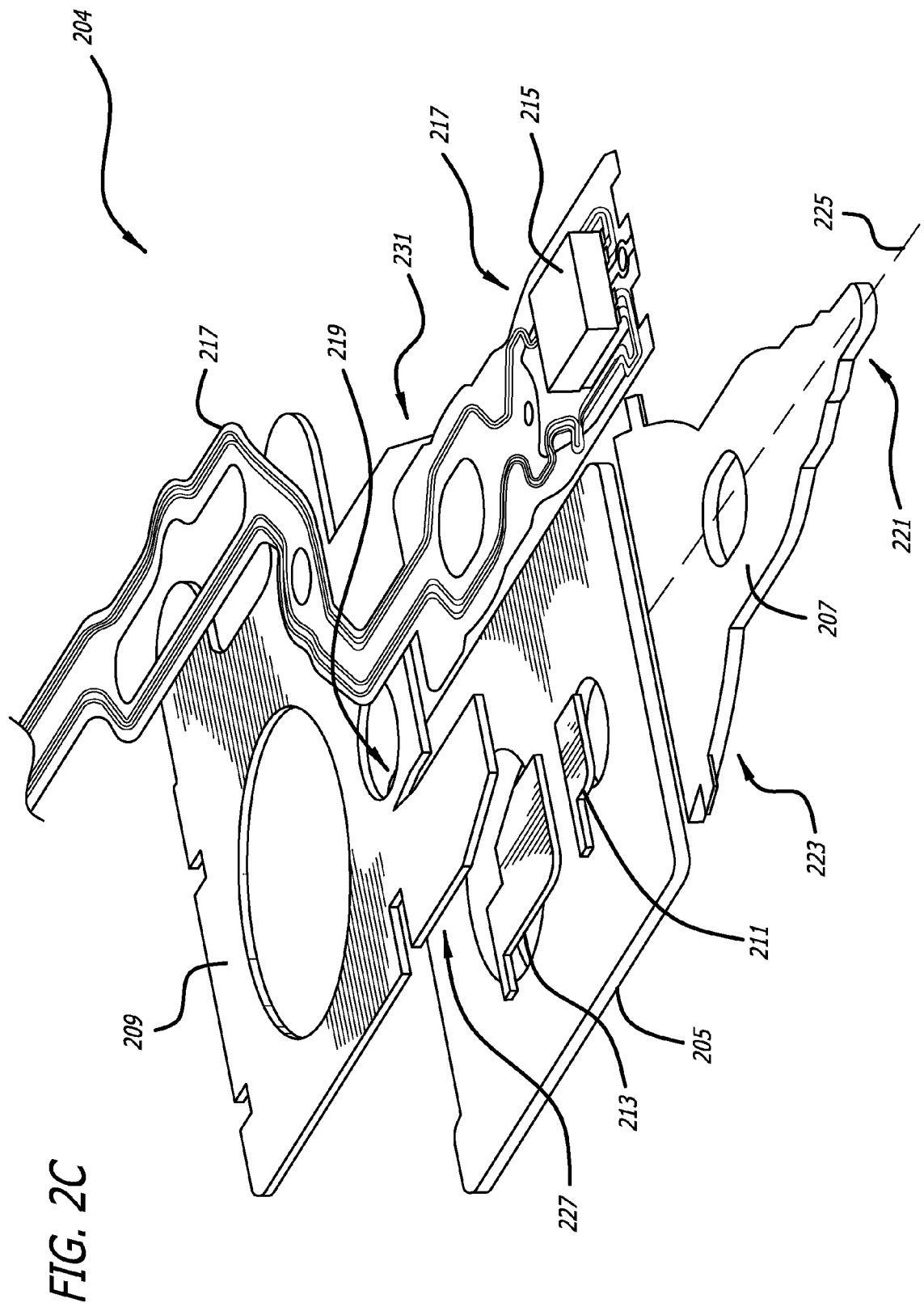
FIG. 2C is a simplified inverted exploded view a suspension assembly according to an embodiment of the present invention.

FIG. 2C is a simplified inverted exploded view of a suspension assembly 204 according to an embodiment of the present invention. Spring extensions 227 and 231 each extends in a longitudinal direction (i.e., parallel to longitudinal axis 225 of load beam 207). Suspension assembly 204 can be said to occupy a down facing position in the disk drive. In a specific embodiment, the active length (interrupt or gap between load beam 207 and base plate 205) of spring extensions extend lengthwise in a range of about 400 microns to about 1000 microns, while extra material can be added to spring extension at base plate distal end and load beam proximal end to accommodate spot welding for secure, rigid connections. Preferably, but not necessarily, spring extensions 227 and 231 are of equal length.

Spring extension 227 is disposed by a vertical offset from spring extension 231. In this embodiment, the vertical offset is accomplished by spacers 211 and 213 underlying spring extension 227, and forms a step 219 (e.g., a slope, grade, or steplike offset) between spring extensions 227 and 231. Spacer 211 underlies extension 227 at the proximal end of load beam 207 and spacer 213 underlies extension 227 at the distal end of base plate 205. In this specific embodiment, spacers can be used on both sides of the gap between the base plate and the load beam so that extension 227 is level. Spacers 211 and 213 can be comprised of a metal layer, resin layer, molded plastic, or any combination thereof, and act to rigidly couple the spring extension 227 at both the base plate distal end as well as load beam proximal end.

The vertical offset between spring extensions results in an effective hinge predisposed to move in a direction favoring a reduction in the inherent off-track between head transducer and magnetic track on the disk, in the presence of disk vertical vibrations (i.e., disk flutter). However, in order to do so, the vertical offset should bring an inner disk spring extension (i.e., the spring extension positioned nearest to the axis of rotation of the disk) closer to the plane of the rotating disk than the outer disk spring extension (i.e., the spring extension positioned farthest from the axis of rotation of the disk). The range of the vertical offset can be in the range of about 10 microns to about 120 microns, preferably about 20 microns to about 70 microns. In specific embodiments, the vertical offset for a desired level of vertical coupling attenuation can be determined as a function of thickness of the slider, thickness of the rotating disk, and diameter of the disk. For example, the relationship between vertical offset and vertical coupling may be expressed by the following relationship, assuming a 3.5 inch diameter, 1.27 mm disk thickness, and 0.3 mm slider thickness:

$$\text{Vertical\_Coupling} = -0.000289 * (\text{Length\_of\_Vertical\_Offset}) + 0.0419$$

Figure 2D:
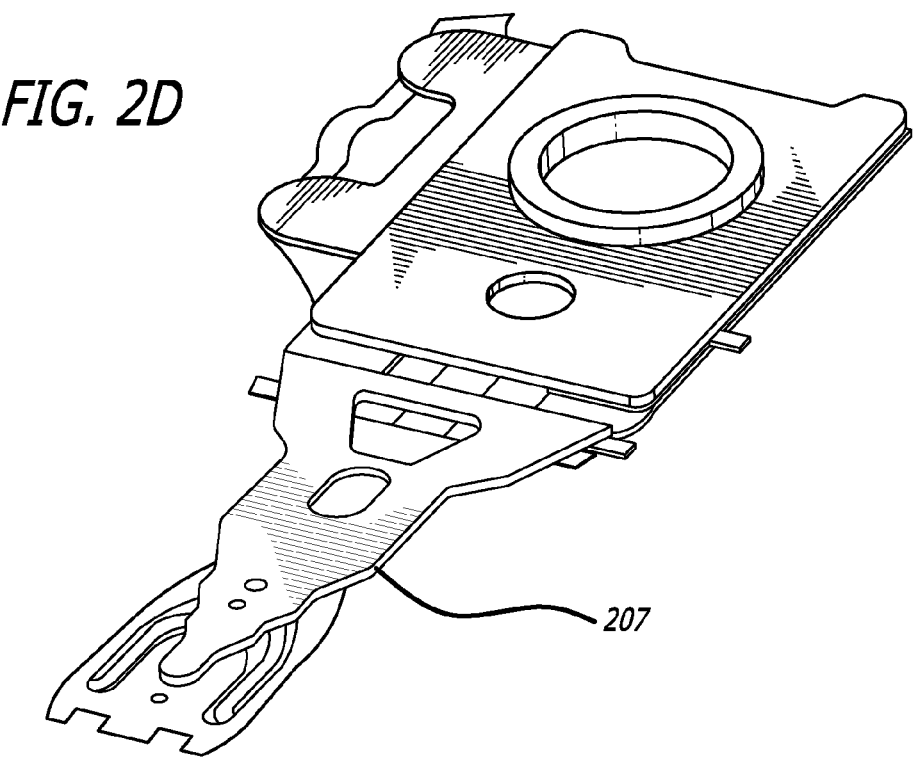
FIGS. 2D and 2E are simplified views a suspension assemblies according to alternative embodiments of the present invention.
Figure 2E:
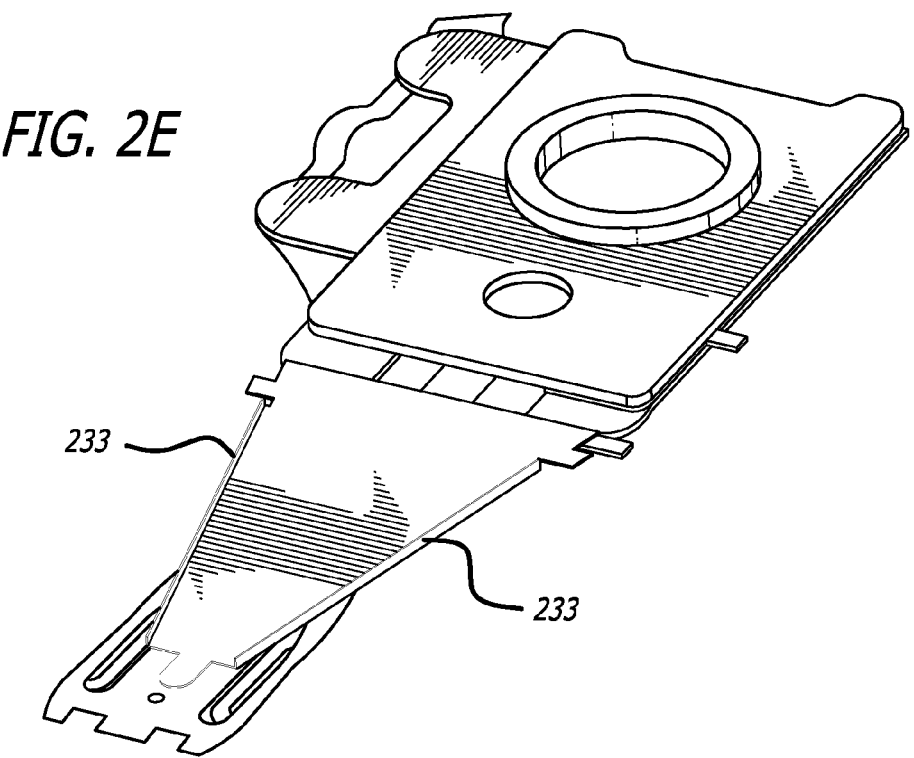

Referring again to FIG. 2C, load beam 207 has a proximal end 223 and a distal end 221. Spring extensions 227 and 231 of hinge member 209 connect to a face of load beam 207 at proximal end 223 on opposite sides of longitudinal axis 225 of the load beam. At distal end 221, slider 215 is in gimbaling contact, for example by use of a protruding dimple formed toward the gimbal tongue, with load beam 207 through flexure 217. In this specific example, load beam 207 is a flat beam of thickness, for example, 0.004 inches to 0.01 inches. However, in other embodiments, load beam 207 can be partially etched on either or both sides to lighten weight as shown in FIG. 2D. In fact, load beam 207 can be etched to create a plurality of holes for even greater weight reduction. In addition, load beam 207 can instead be made of thinner material, for example 0.002 inches, and include rails for increased support. In FIG. 2E, the load beam includes edge rails 233 along a substantial length of the load beam.

Figure 3A:
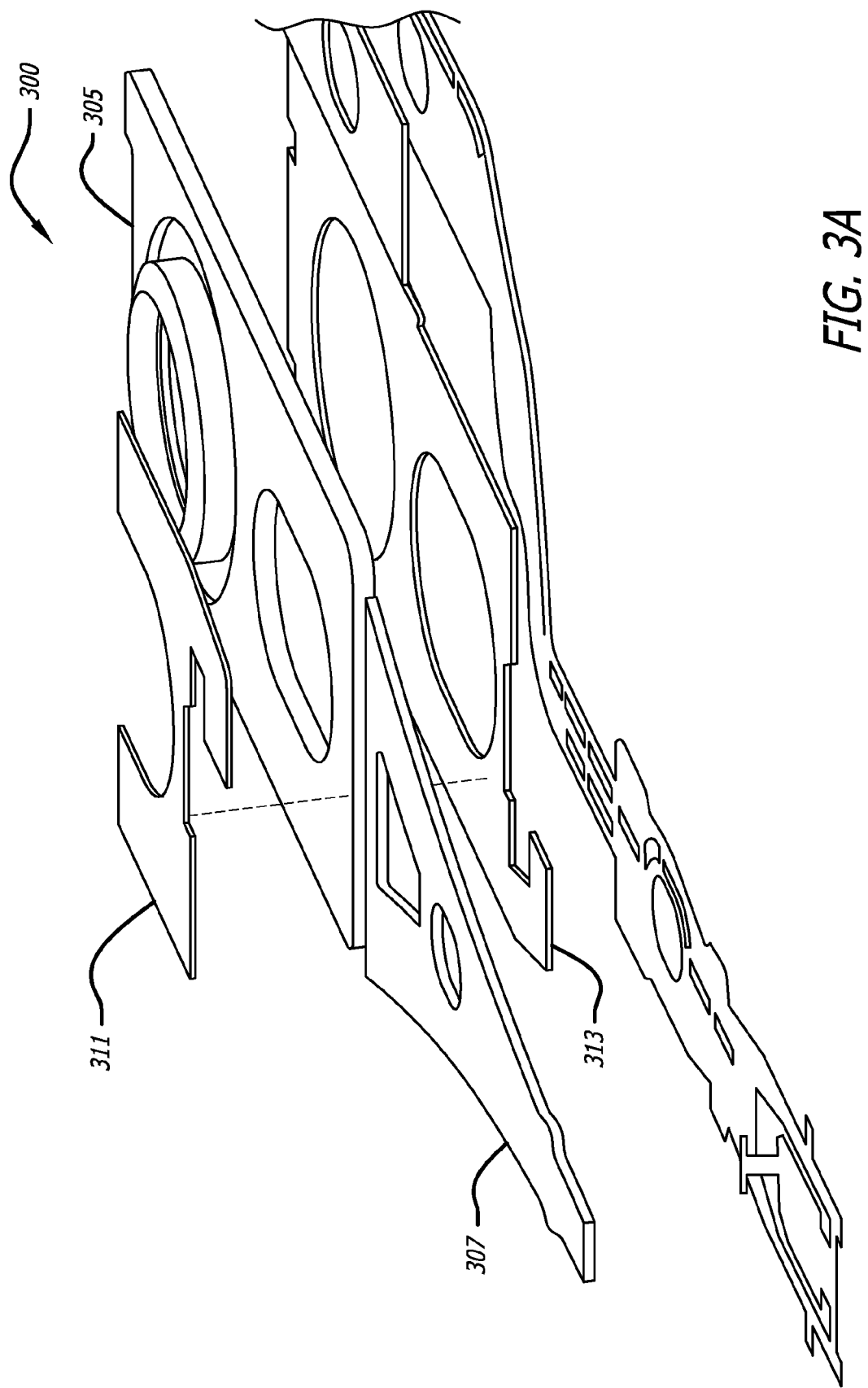
FIG. 3A is a simplified exploded view of a suspension assembly according to an embodiment of the present invention.

FIG. 3A is a simplified exploded view of a suspension assembly 300 according to an embodiment of the present invention. This diagram is merely an example, which should not unduly limit the scope of the claims herein. One of ordinary skill in the art would recognize other variations, modifications, and alternatives. In this embodiment, base plate 305 is coupled to load beam 307 through two hinges, hinge 311 and hinge 313. These hinges are disposed by a vertical offset. In this example, the vertical offset is accomplished by the fact that hinge 311 couples to one face of load beam 307, while hinge 313 couples to an opposite face of load beam 307. The vertical offset is thus equal to the thickness of the load beam. In alternative embodiments, the vertical offset can be increased with the use of spacers or steps. The vertical offset between hinges 311 and 313 can be introduced by mechanical milling, ion milling, laser ablating, and/or chemical etching portions of the load beam and base plate.

Figure 3B:
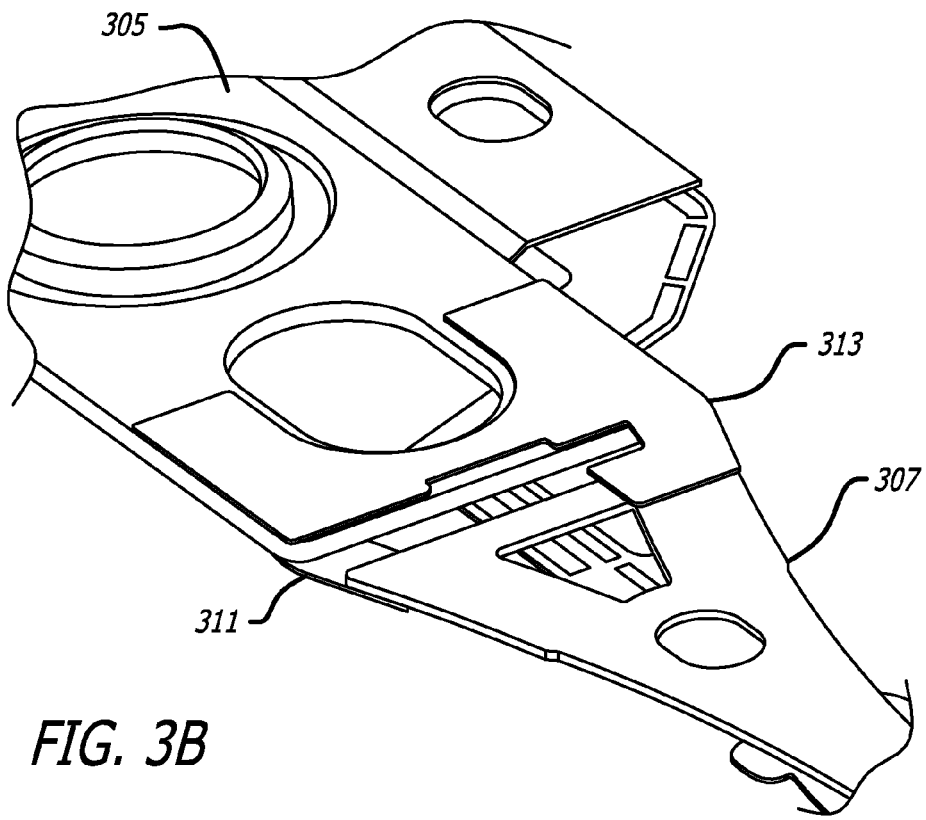
FIGS. 3B and 3C are simplified views of a suspension assembly according to an embodiment of the present invention.
Figure 3C:
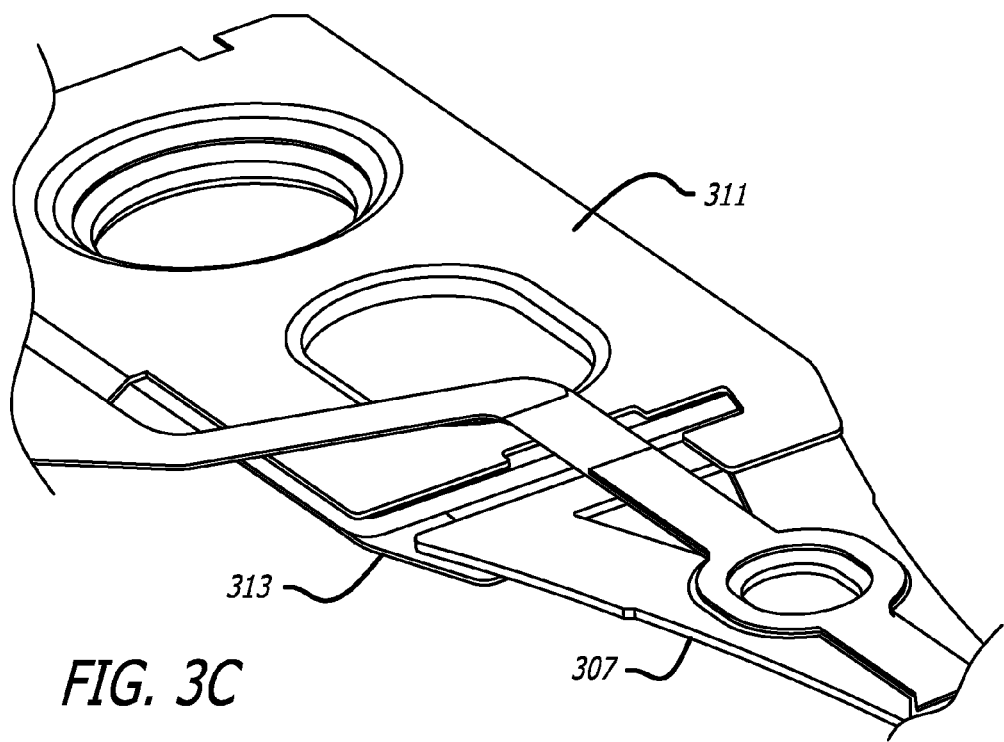

FIGS. 3B and 3C are top and bottom views of suspension assembly 300. Hinge 313 couples to a first face of load beam 307, while hinge 311 couples to a second face of load beam 307. In alternative embodiments, hinge 311 and 313 can be reversed, so long as the vertical offset brings an inner disk hinge (e.g., the hinge positioned nearest to the axis of rotation of disk) closer to the disk surface than an outer disk hinge (e.g., the hinge positioned farthest from the axis of rotation of disk).

Figure 4:
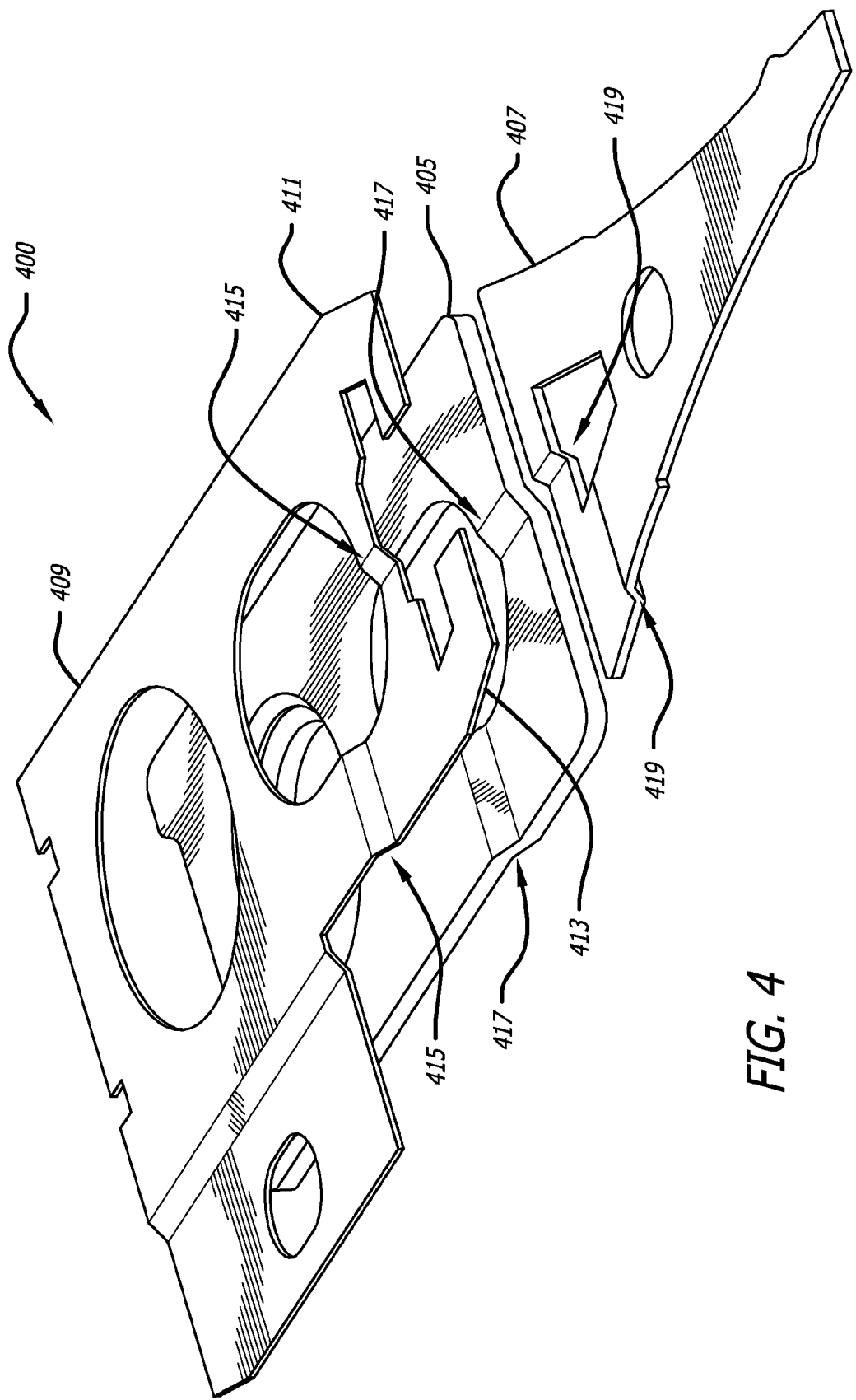
FIG. 4 is a simplified view of a suspension assembly according to an embodiment of the present invention.

FIG. 4 is a simplified view of a suspension assembly 400 according to another embodiment of the present invention. This diagram is merely an example, which should not unduly limit the scope of the claims herein. One of ordinary skill in the art would recognize other variations, modifications, and alternatives. Elements of the suspension assembly 400 are formed to provide a vertical offset between spring extensions 411 and 413. In this example, steps 415 of hinge member 409 raise spring extension 411 (or lower spring extension 413). As spring extensions 411 and 413 are to extend in parallel, base plate 405 and load beam 407 are correspondingly shaped using steps 417 and 419.

Figure 5A:
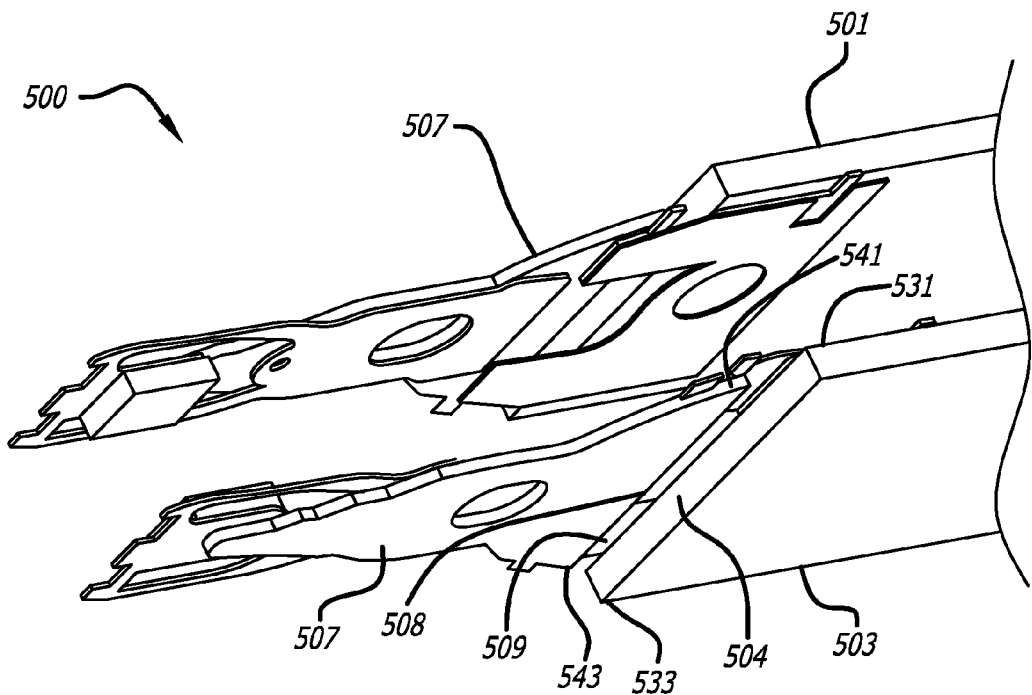
FIGS. 5A and 5B are simplified views an actuator arm assembly according to an embodiment of the present invention.
Figure 5B:
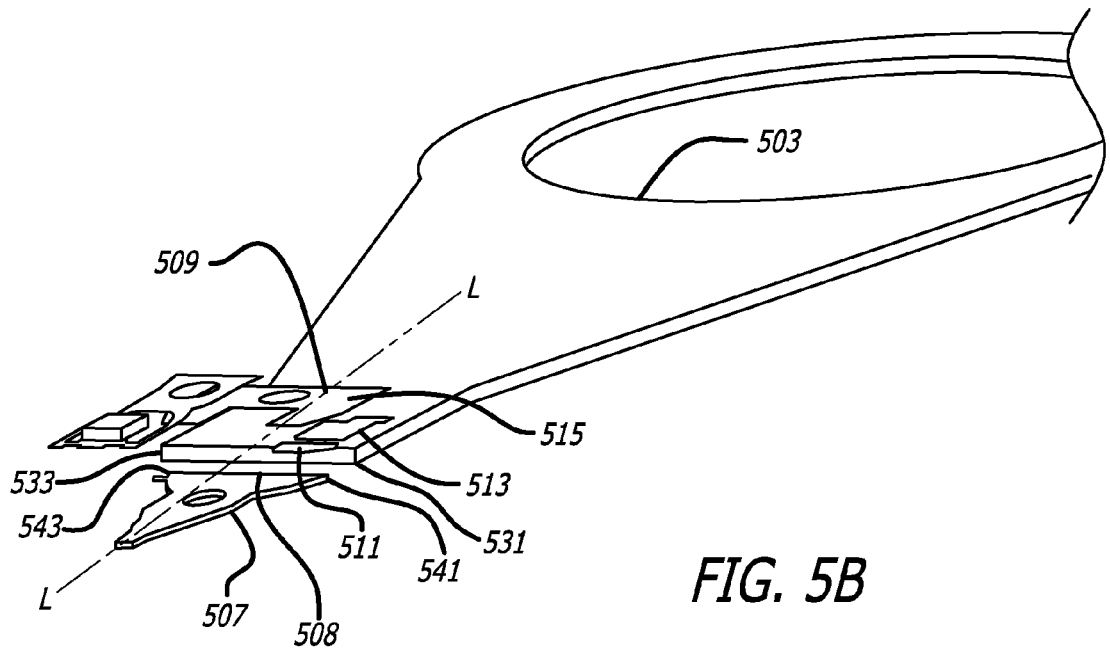

FIGS. 5A and 5B are simplified views an actuator arm assembly 500 according to an embodiment of the present invention that includes a hinge member 509, load beam 507, flexure, and slider. These diagrams are merely examples, which should not unduly limit the scope of the claims herein. One of ordinary skill in the art would recognize other variations, modifications, and alternatives. In this specific embodiment, a hinge member 509 connects directly to an actuator arm 503 (or actuator arm 501) without a base plate. The spring extensions of hinge member 509 connect to load beam 507. Spacers 511 and 513, underlying spring extension 515, provide a vertical offset between spring extensions to reduce mis-registration induced by disk flutter. As can be seen in FIGS. 5A and 5B, and also in FIG. 14 which also shows spacers being used to raise or lower one spring extension, the spacers 511 and 513 introduce the desired vertical offset by raising one spring extension relative to the other spring extension, but do not raise or lower the left proximal corner 541 of load beam 507 relative to the right proximal corner 543. Similarly, the spacers introduce the desired vertical offset without raising or lowering the left proximal corner 541 of load beam 507 relative to the left distal corner 531 of actuator arm 503 (or base plate, for suspension assemblies that include base plates), or raising or lowering the right proximal corner 543 of load beam 507 relative to the right distal corner 533 of actuator arm 503 (or base plate). As seen in the figures, the result is that proximal corners 541 and 543 of load beam 507 are held at the same vertical level, spacers 511 and 513 do not introduce any roll into load beam 507 along longitudinal axis L, and the proximal edge 508 of load beam 507 remains substantially horizontal and remains substantially parallel to distal edge 504 of mounting part 503, which in the illustrative embodiment shown is actuator arm 503. Proximal edge 508 of load beam 507 thus remains substantially parallel and without being tilted relative to either the plane of mounting part 503 or relative to the plane of the disk surface.

Figure 6C:
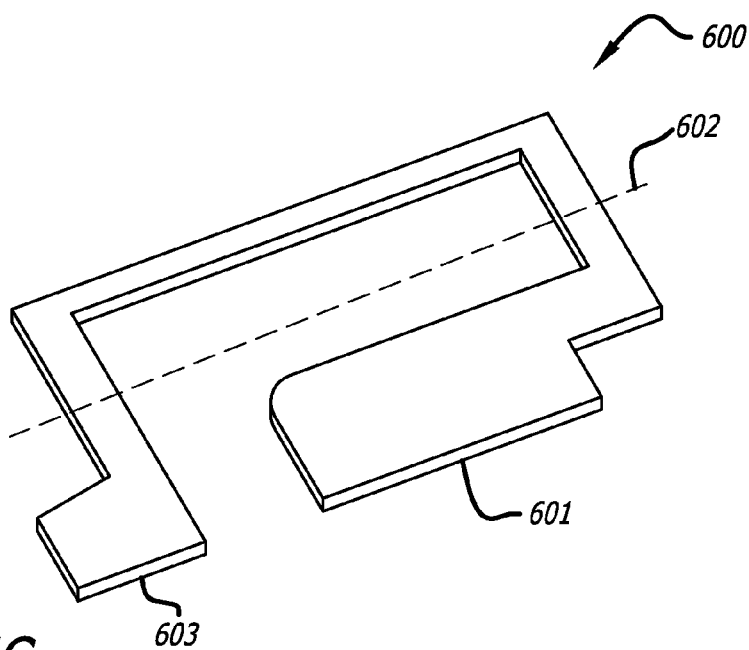
FIG. 6C is a perspective view of the spacer 600 of FIG. 6A.
Figure 6A:
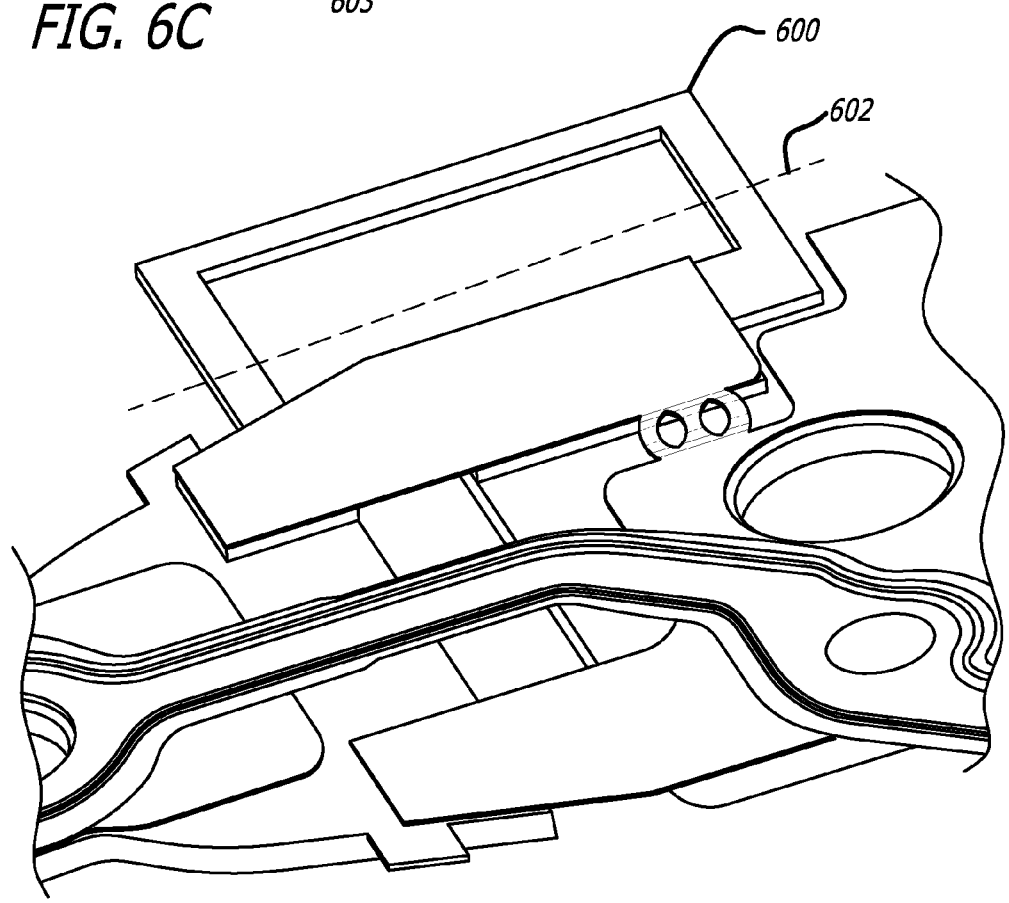
FIGS. 6A and 6B are simplified views of suspension assemblies according to embodiments of the present invention.

FIG. 6A illustrates a suspension assembly including spacer member 600 according to an embodiment of the present invention. Spacer member 600 is singulated at line 602 to form spacers 601 and 603. Spacer member 600 improves manufacturability by reducing the number of piece parts handled. Spacer member 600 can be layered in a suspension assembly, welded, and then singulated in lieu of working with two individual spacers.

FIG. 6C is a view of spacer 600 by itself before being placed onto a suspension assembly as illustrated in FIG. 6A. It should be noted that FIGS. 6A and 6C are merely examples of a space member and spacers, and should not unduly limit the scope of the claims herein. One of ordinary skill in the art would recognize many other variations, modifications, and alternatives. For example, spacers 601 and 603 are shown to be shaped as polygons (i.e., a closed plane object bounded by straight lines), but spacers can take any arbitrary spatial form (such as a square, rectangle, triangle, circle, oval, or others) and many sizes. Spacers will generally follow the form of the corresponding portion of a spring extension (or hinge), although that is not necessarily so. A spacer can be larger or smaller than its corresponding portion of the spring extension (or hinge). If the spacer is smaller, then the corresponding portion of the spring extension (or hinge) will not be entirely supported by the spacer. In a specific embodiment, spacers have an aggregate area of at least 50% of the raised/lowered spring extension.

Figure 6B:
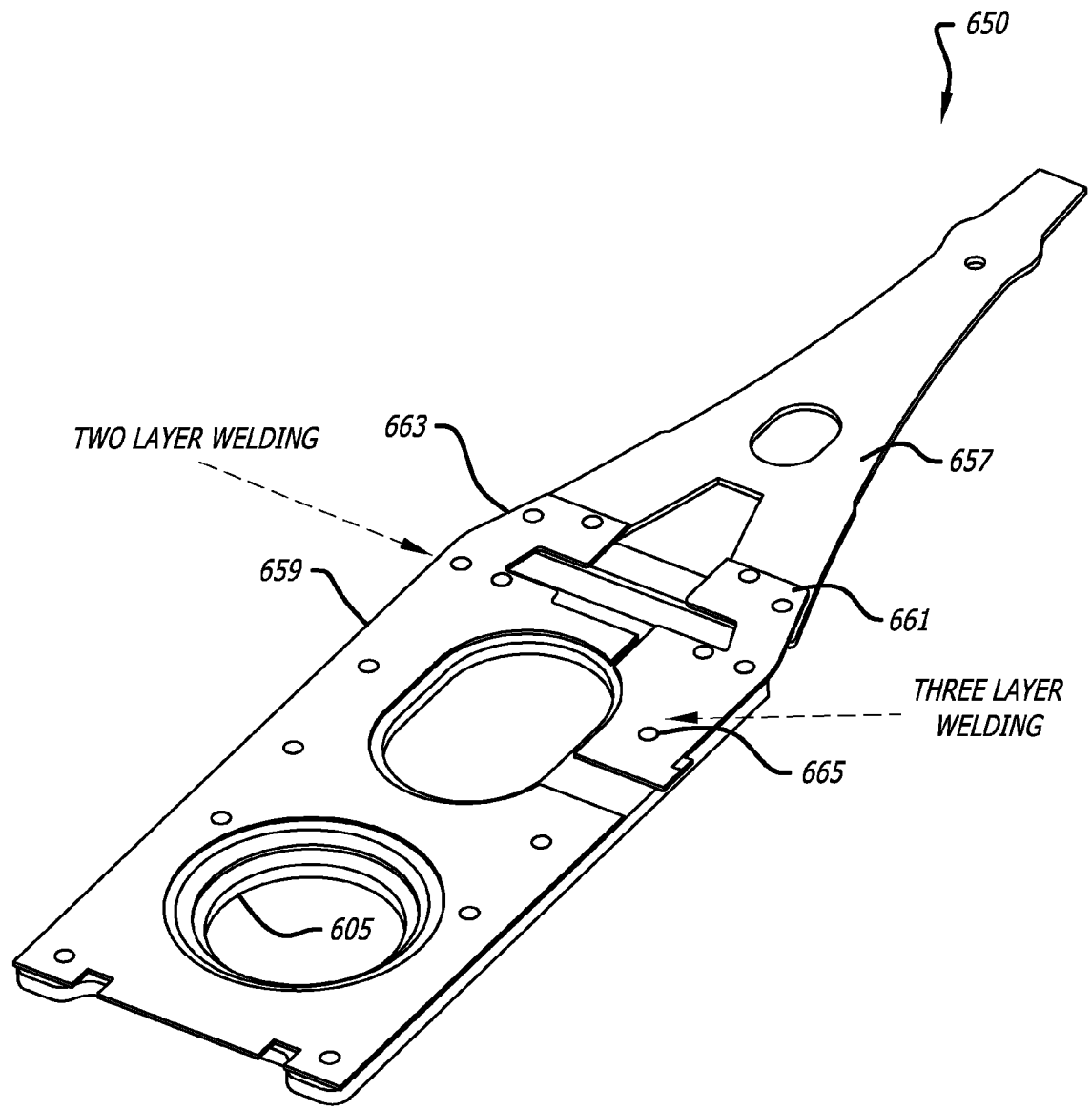

FIG. 6B illustrates a suspension assembly 650 according an embodiment of the present invention. This diagram is merely an example, which should not unduly limit the scope of the claims herein. One of ordinary skill in the art would recognize other variations, modifications, and alternatives. In this embodiment, hinge member 659 is constructed from two separate pieces. A first piece includes spring extension 663, while a second piece includes spring extension 661. The layers of suspension assembly 650 are welded together at spot weld(s) 665. The first piece is two layer welded to both a load beam 605 and a base plate 657. The second piece is three layer welded to an underlying spacer and both the load beam and base plate. Alternatively, layers of a suspension assembly can be coupled using a suitable rigid adhesive, such as epoxy. Also, hinge member 659 can be singulated into a plurality of pieces. In fact, a hinge member may have a plurality of spring extensions (such as two, three, or more). Vertical offsets between a plurality of spring extensions (or hinges in alternative embodiments) can results in an effective hinge predisposed to move in a predetermined direction. It should be noted for the purpose of clarity that the two and three layer welding shown in FIG. 6B can be applied to other embodiments disclosed herein, such as similar embodiments illustrated in FIGS. 2A-2E and FIGS. 5A-5B FIGS. 7 and 14-17 are simplified views of suspension assemblies according to various embodiments of the present invention, and are described in reference to a down facing position in the disk drive as in suspension assembly 204 of FIG. 2A. These diagrams are merely examples, which should not unduly limit the scope of the claims herein. One of ordinary skill in the art would recognize other variations, modifications, and alternatives. FIG. 7 shows a simplified suspension assembly having left and right side spring extensions 711 and 713, respectively. FIGS. 14-17 show configurations of a suspension assembly having a vertical offset between spring extensions 711 and 713. In suspension assembly 700(*a*) of FIG. 14, spring extension 711 is lowered with the use of spacers 715 positioned on opposite sides of the interrupt or gap between load beam 707 and base plate 705. This is consistent with suspension assembly 204 of FIG. 2B. As can be seen in the figure, in this particular embodiment left proximal corner 541 of load beam 707 is neither raised nor lowered by the presence of spacer(s) 715 and the bend in spring extension 711 to accommodate spacer(s) 705, relative to left distal corner 731 of the mounting part which in the embodiment is base plate 705. Thus, the presence of spacer(s) 715 does not introduce any roll into load beam 707. Alternatively, as illustrated by suspension assembly 700(b) in FIG. 15, the load beam 707 can be formed to include a step 719 to lower (from one perspective view) a portion of spring extension 711 without the use of spacer 715. On the other hand, the spring extension 713 can be raised (in lieu of lowered spring extension 711) to accomplish the vertical offset. Suspension assembly 700(c) of FIG. 16 includes a step in the base plate 705 and the load beam 707 to raise spring extension 713. In another specific embodiment shown in FIG. 17, suspension 700(d) can be formed by mechanical milling, ion milling, laser ablating, or chemical etching to have a thinner portion along the gap where spring extension 713 couples. One of ordinary skill in the art would recognize these embodiments shown in FIGS. 14-17, as well as other embodiments of present invention disclosed herein, may be combined or substituted. For example, a vertical offset can be fashioned using spacers to lower spring extension 711, while also using steps in the base plate and load beam to raise spring extension 713.

FIGS. 18-22 illustrate suspension assemblies having a first hinge and a second hinge, with first hinge 719 and second hinge 721 coupling to opposite faces of load beam 707, thereby creating the vertical offset as shown for example in suspension assembly 700(g) of FIG. 20. For suspension assembly 700(e) in FIG. 18, a portion 714 of the load beam 707 is formed up toward second hinge 721. This formed amount can correspond to a difference in thickness of load beam 707 to base plate 705. In this way, spring extension 721 remains substantially parallel with spring extension 719, but vertically offset. The thickness of a base plate (as measure between opposite faces of the plate) is generally in the range of about 0.10 microns to about 0.25 microns. As an alternative shown in FIG. 19, a spacer 715 can be disposed between spring extension 722 and load beam 707 to compensate for the difference in thickness. Another alternative suspension 700(h) shown in FIG. 21 provides a load beam with two vertically disposed portions 2102 and 2104 for coupling the extensions. In yet another alternative shown in FIG. 22, a portion of the base plate 2205 in suspension assembly 700(i) is formed by mechanical milling, ion milling, laser ablating, or chemical etching to have a thickness equal to the thickness of the load beam 2207.

Figure 23:
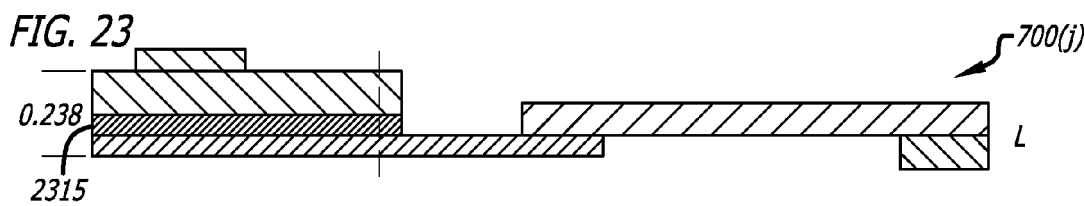
FIG. 23 is a simplified view of the left side of an embodiment of the present invention which employs a spacer in the base plate region, and a step in the load beam to raise the right side spring extension.
Figure 24:
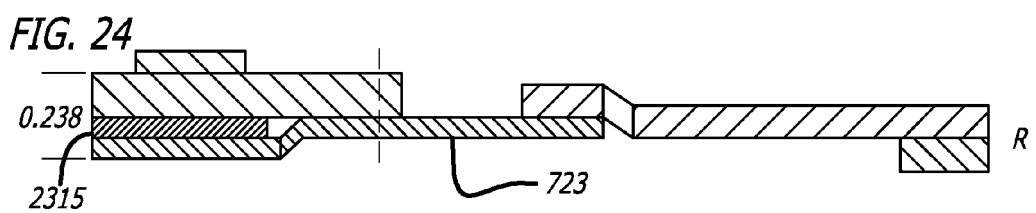
FIG. 24 is a simplified view of the right side of the embodiment of FIG. 23.
Figure 25:
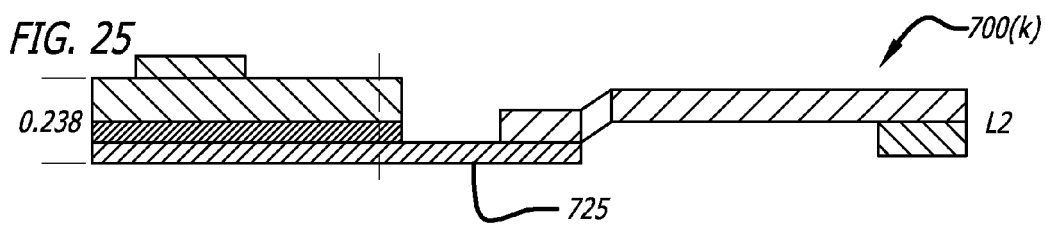
FIG. 25 is a simplified view of the left side of an embodiment of the present invention which employs a spacer in the base plate region, and a step in the load beam to lower left the left side spring extension.
Figure 26:
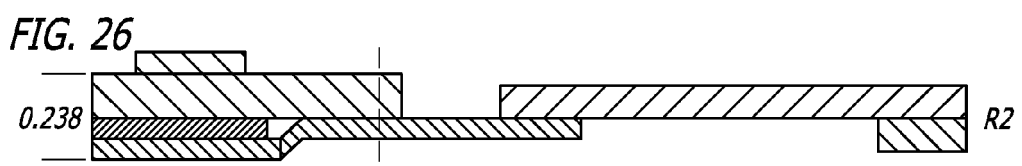
FIG. 26 is a simplified view of the right side of the embodiment of FIG. 25.
Figure 27:
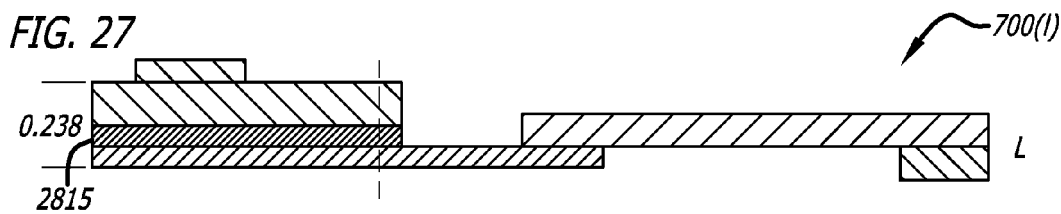
FIG. 27 is a simplified view of the left side of the embodiment of the present invention which employs load beam thinning to one side and a spacer to produce a vertical offset.
Figure 28:
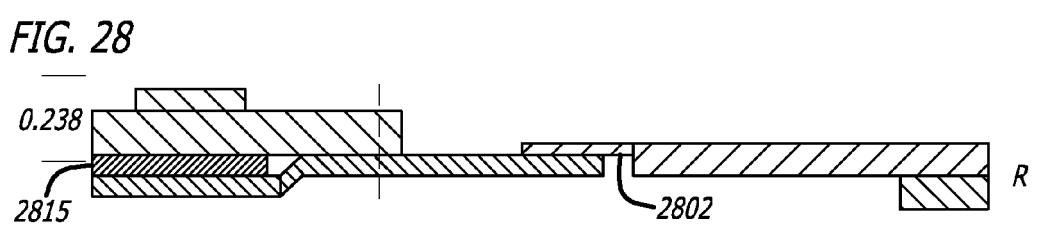
FIG. 28 is a simplified view of the right side of the embodiment of FIG. 27.

FIGS. 23 and 24 show opposite side views of a suspension assembly 700(j). The load beam is asymmetric and includes a step on one side to raise spring extension 723, and employs a spacer 2315 in the base plate region. Similarly, as shown in FIGS. 25 and 26, an asymmetric load beam in suspension assembly 700(k) can also lower spring extension 725. Suspension system 700(l) of FIGS. 27 and 28 uses a combination of load beam thinning (2802) to one side and a spacer(s) 2815 to produce a vertical offset.

Figure 29:
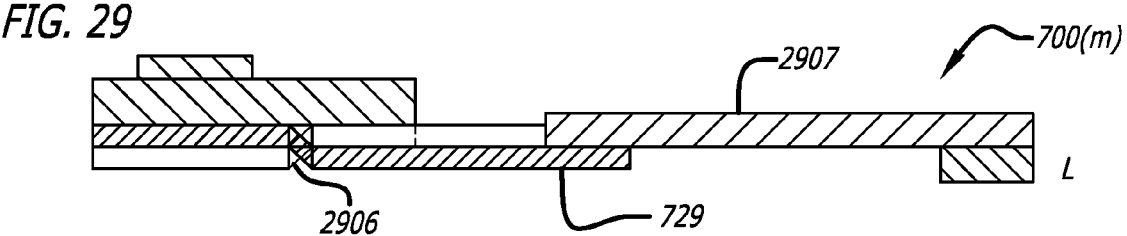
FIG. 29 is a simplified view of the left side of an embodiment of the present invention which employs a combination of load beam thinning to one side and a spacer(s) to produce the vertical offset.
Figure 30:
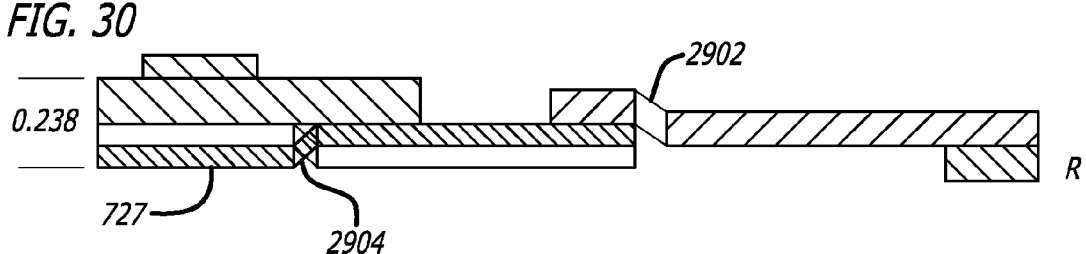
FIG. 30 is a simplified view of the right side of the embodiment of FIG. 29.
Figure 31:
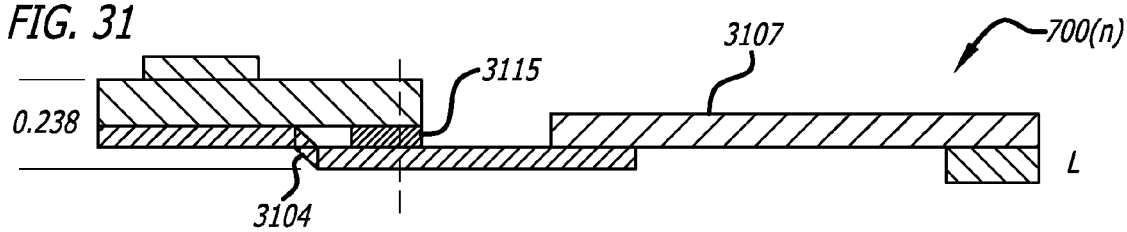
FIG. 31 is a simplified view of the left side of an embodiment of the present invention which employs a combination of a step on one side of the load beam, and steps in the spring extensions on each side.
Figure 32:
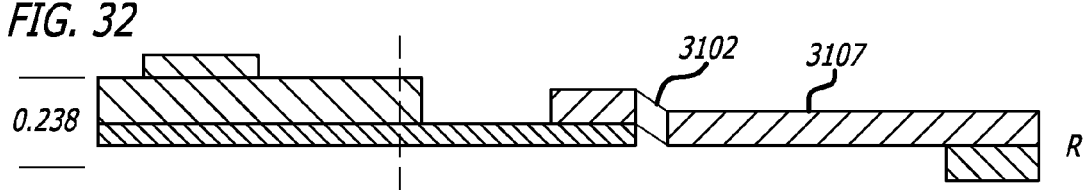
FIG. 32 is a simplified view of the right side of the embodiment of FIG. 31.

FIGS. 29 and 30 show opposite side views of suspension assembly 700(m) having an asymmetric load beam. In addition to the step 2902 formed/milled/etched on one side of the load beam 2907, spring extensions 727 and 729 each includes a step 2904 and 2906, respectively. These steps raise spring extension 727 and lower spring extension 729. In alternative embodiment, these steps and asymmetric load beam could lower spring extension 727 and raise spring extension 729. Suspension assembly 700(n) in FIGS. 31 and 32 use an asymmetric load beam 3107, steps 3102 and 3104, and spacer 3115 to achieve a vertical offset between extensions.

Figure 8A:
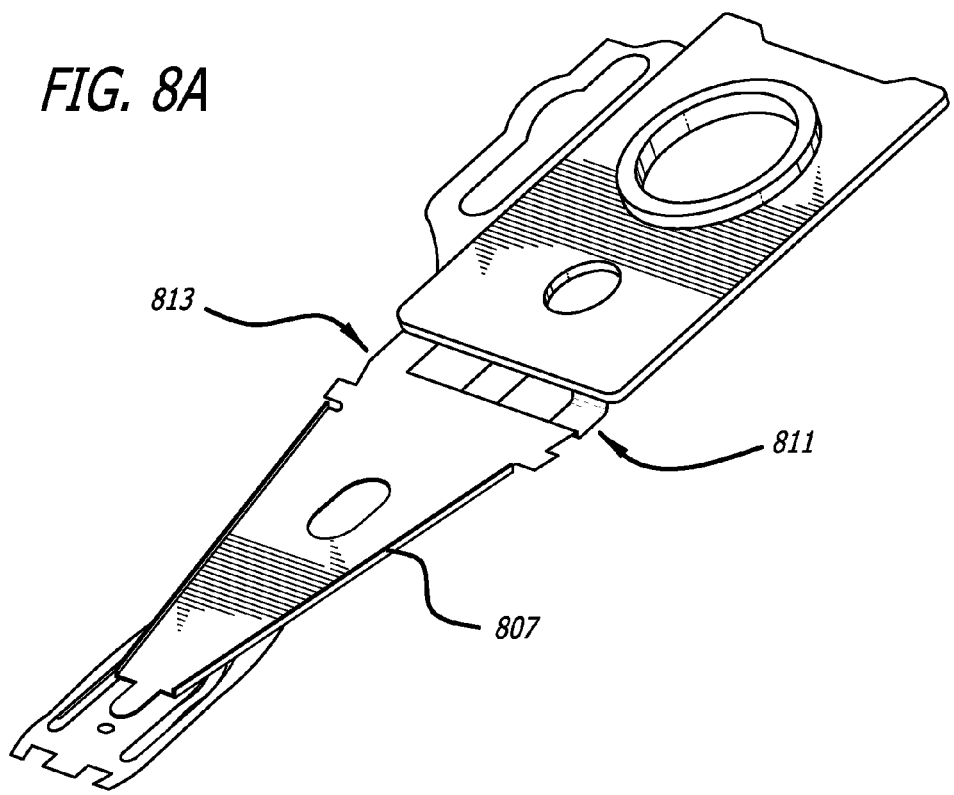
FIG. 8 illustrates a suspension assembly according to an embodiment of the present invention.
Figure 8B:
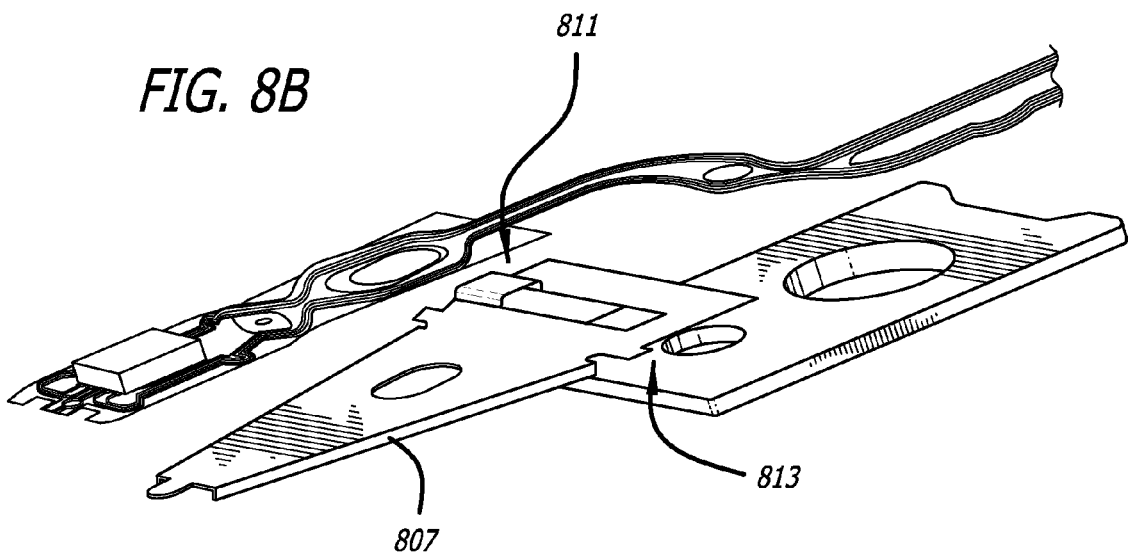
Figure 9A:
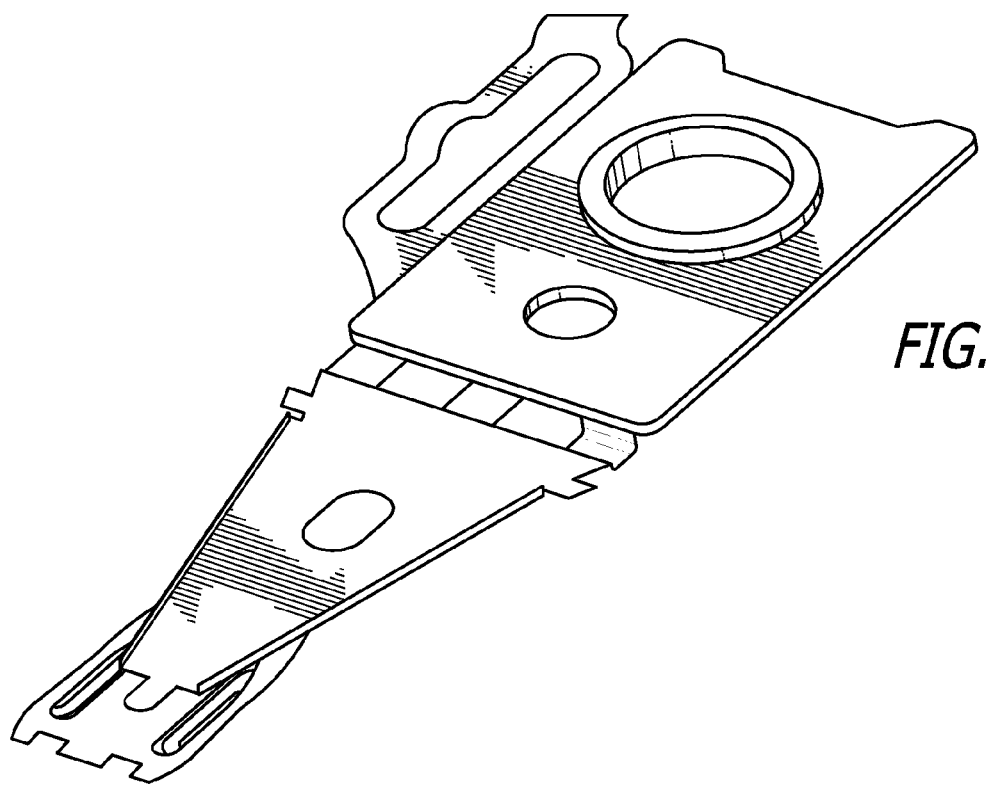
FIG. 9 illustrates a suspension assembly according to an embodiment of the present invention.
Figure 9B:
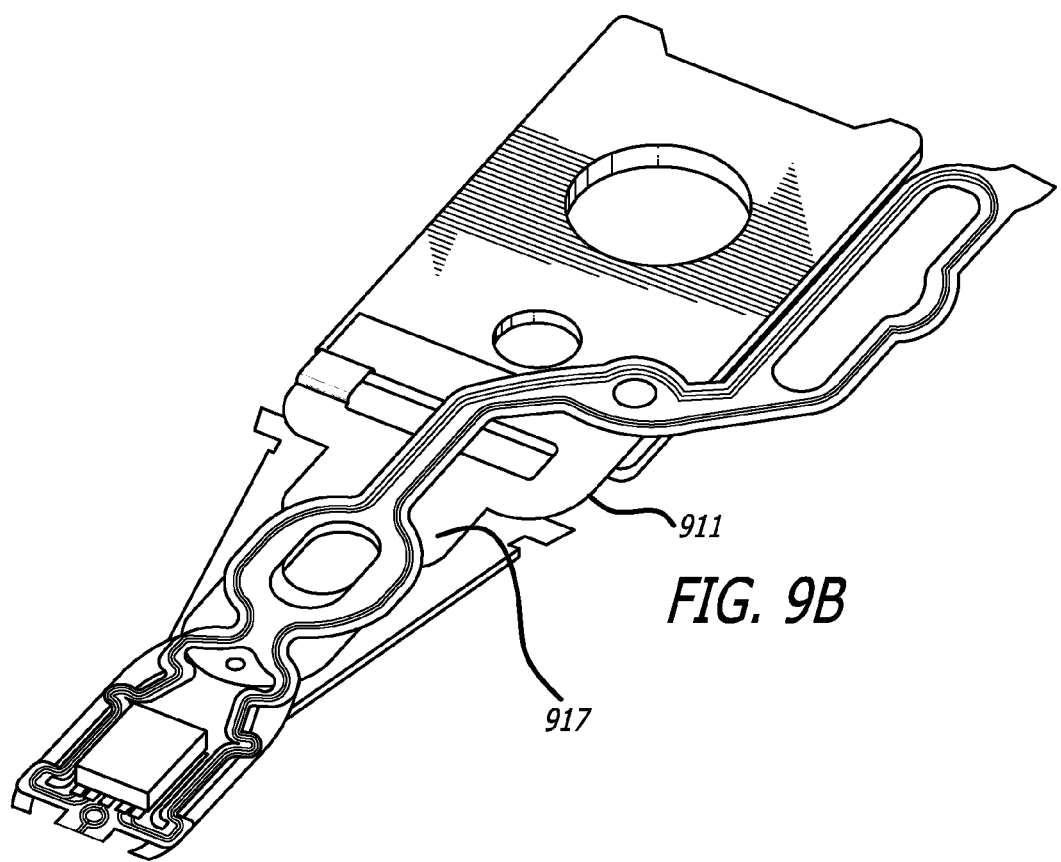

FIGS. 8A and 8B show top and bottom views, respectively, of a suspension assembly 800 according to an embodiment of the present invention. This diagram is merely an example, which should not unduly limit the scope of the claims herein. One of ordinary skill in the art would recognize other variations, modifications, and alternatives. In this example, load beam 807 includes an integrated hinge member 811/813. A spring portion of load beam 807 includes spring extensions 811 and 813. Spring extension 811, shaped as a trench, is vertically offset from spring extension 813. The trench is substantially rectangular in FIG. 8, but can take any arbitrary shape in alternative embodiments. The depth of the trench can be in a range of about 10 microns to about 120 microns, or more. Alternatively, a flexure 917, instead of a load beam, can include an integrated hinge member 911 as shown in FIGS. 9A and 9B.

Figure 10A:
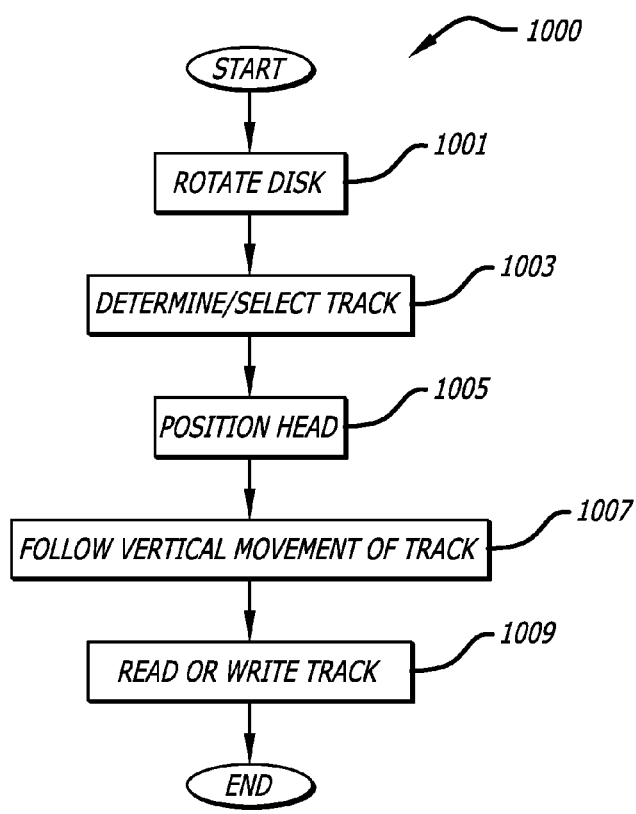
FIG. 10A is a simplified flowchart illustrating operation of a disk drive unit according to an embodiment of the present invention.

FIG. 10A shows a simplified flow 1000 for operating a disk drive unit according to an embodiment of the present invention. This diagram is merely an example, which should not unduly limit the scope of the claims herein. Of course, other alternatives can also be provided where steps are added, one or more steps are removed, or one or more steps are provided in a different sequence without departing from the scope of the claims herein.

The disk is rotated in step 1001 at a predetermined rotational speed, generally in the range of about 5,000 rpm to about 15,000 rpm. In step 1003, a track on a disk (or other storage medium) is selected or determined for reading or writing. In step 1005, a head coupled to actuator arm via a suspension assembly is position in proximity to the selected track. Operating at the predetermined rotational speed, the disk can undergo a vertical movement due to flow induced disk vibration (disk flutter). In step 1007, the suspension assembly follows the vertical movement of the disk from a reference position (i.e., a position in the absence of disk flutter) to a second position. In the second position during the vertical movement of the disk, the head is in better alignment (and/or closer proximity) to the selected track than otherwise if the first and second spring extensions (or hinges) are substantially co-planar (e.g., insignificant or no vertical offset). The suspension assembly is predisposed to follow the vertical movement of the disk by a vertical offset between a first and second extensions (or hinges) in the suspension assembly. In step 1009, the track can be read or written more accurately since off-track misalignment has been substantially reduced or eliminated.

FIGS. 10B and 10C illustrate operation of a disk drive unit according to an embodiment of the present invention. These diagrams are merely examples, which should not unduly limit the scope of the claims herein. One of ordinary skill in the art would recognize other variations, modifications, and alternatives. In FIG. 10B, overlooking the consequences of disk vibration, central axis 1053 of disk 1051 is a straight line when disk 1051 rotates about a spindle (not shown). Head element 1057 mounted to slider 1055 aligns with a specified track 1059. However, as shown in FIG. 10C, disk vibration modes can cause a motion in a z-direction of disk 1051 when it rotates. Central axis 1053 bends. This bending of central axis 1053 is often more pronounced at a periphery region of disk 1051. In a conventional disk drive units, a head element 1056 could be off-track from the specified track in the x-direction, such as by a distance 1061. In an embodiment of the present invention, a suspension assembly is predisposed to follow a movement of disk 1051, and thus, during the movement of disk 1051, head element 1057 coupled to slider 1055 is predisposed to a position as indicated by direction 1063 to reduce distance 1061. The motion of the suspension assembly as it follows disk 1051 during disk vibrations is not entirely in a plane defined by disk 1051 at rest (an x-y plane), but the motion can be tilted at an angle effectively. This effective angle can be in a range of about 0° to about 2° (oriented to reduce off-track distance). FIG. 10C is an example of about 100% attenuation of vertical coupling. In an alternative embodiment, attenuation can be any lesser amount, such as about 50%.

Figure 11:
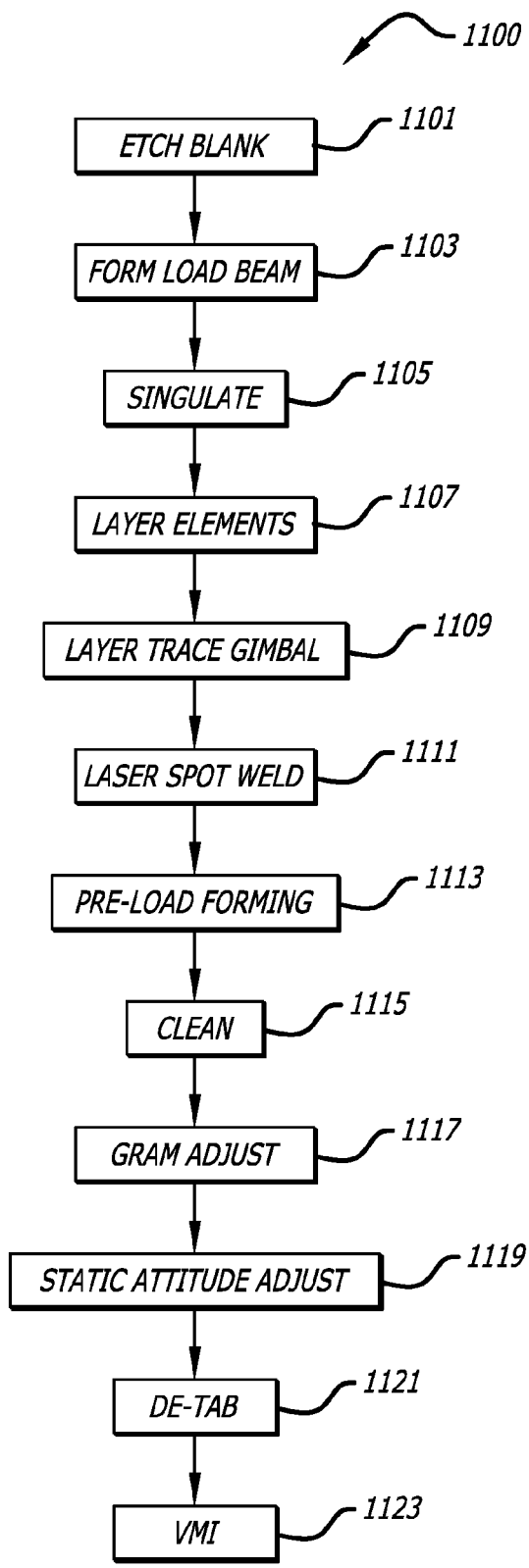
FIG. 11 is a simplified flowchart illustrating manufacturing a suspension assembly according to an embodiment of the present invention.

FIG. 11 shows a flow diagram for manufacturing a suspension according to an embodiment of the present invention. This diagram is merely an example, which should not unduly limit the scope of the claims herein. Although the present invention has been described using a particular series of steps, it should be apparent to those skilled in the art that the scope of the present invention is not limited to the described series of steps. For example, described steps can be performed in a different sequence, and one or more step may be skipped altogether, without departing from the scope of the claims herein.

In step 1101, a thin sheet of stainless steel is etched by photochemical etching to form the general shapes of a plurality of suspensions. Next, different stamping operations are carried out (e.g., rails, dimple, and step formation) in step 1103. In step 1105, each load beam is singulated from the sheet. Component parts of the suspension assembly (such as a load beam, spacer member, hinge member, base plate, or combinations thereof) are next layered in step 1107. To enable the reading and writing function of the head, a flexible polyimide and copper dielectric (trace) is attached to the head in step 1109. Spot welding the layers together takes place in step 1111. In steps 1113 and 1115, each suspension assembly undergoes pre-load forming by rolling or coining forming and then cleaning. Once pre-formed and cleaned, the suspension gram load is fine adjusted in step 1117. The gram load of the suspension gives it the ability to maintain, a precise distance between the head and the disk to be read (fly height) by giving the load beam a pre-load force counteracting the air bearing created by the rotating disk. In step 1119, the static attitude of each suspension is laser adjusted for accurate non-contact shaping of metallic components. Details of static attitude adjust are described in U.S. application Ser. No. 10/319,784 filed Dec. 12, 2002, which is incorporated herein for all purposes. Each suspension is finally sorted in step 1121, and cleaned and visually inspected in step 1123.

Figure 12:
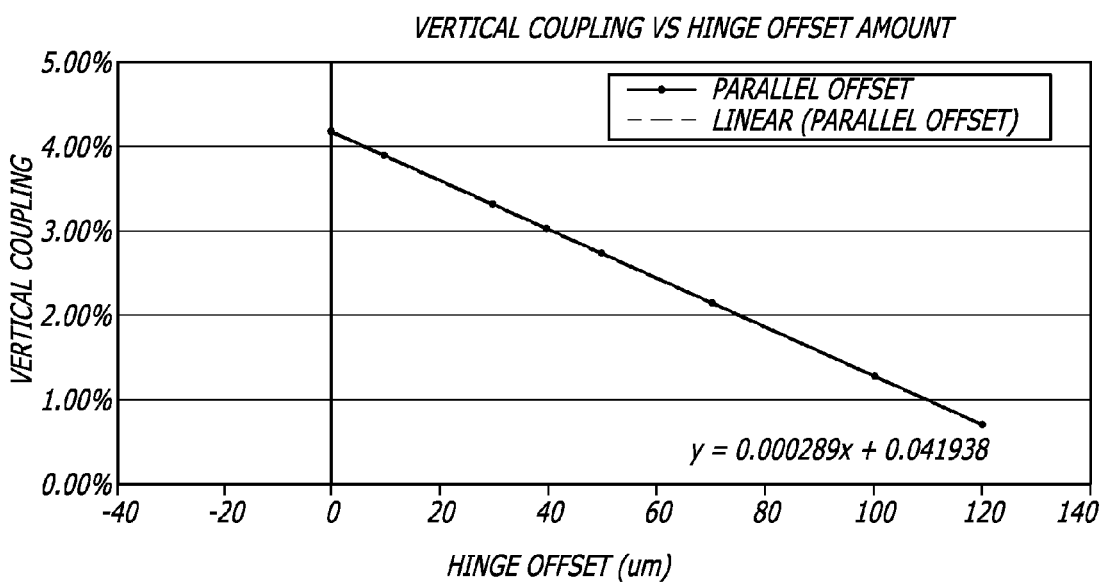
FIG. 12 plots the relationship between vertical coupling and a hinge offset amount for a specific embodiment.

FIG. 12 plots the relationship between vertical coupling and a hinge (or spring extension) offset amount for a specific embodiment of the present invention. In this embodiment, a 3.5 inch diameter disk has a thickness of 1.27 mm, and a slider has a thickness of 0.3 mm. Off-track effects due to disk flutter are worse when reading or writing at the outer diameter of the disk, so this simulation represents that condition. As can be seen in FIG. 12, vertical coupling is linearly reduced with respect to the hinge offset amount. The results described apply to this specific embodiment, and should not unduly limit the scope of the claims herein.

Figure 13:
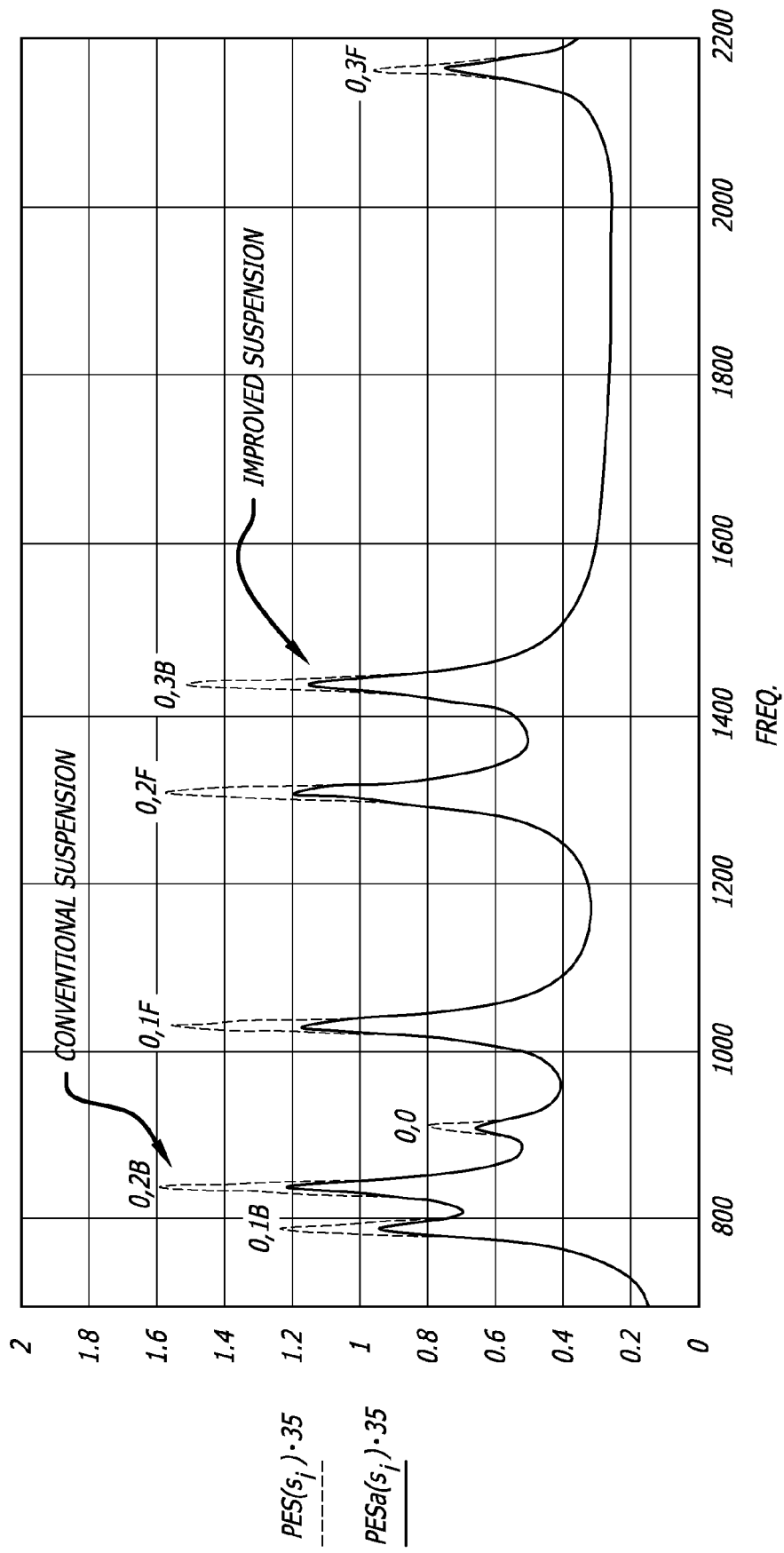
FIG. 13 shows position error signal simulation results of a suspension assembly according to a specific embodiment of the present invention.
Figure 22:
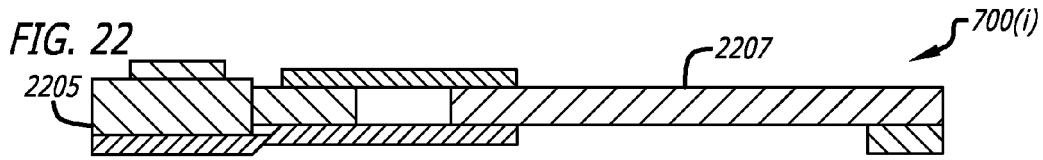
FIG. 22 is a simplified view of an embodiment of the present invention in which a portion of the base plate is formed by milling, ablating, or etching.

FIG. 13 shows a simulation result of a specific embodiment of the present invention. In this simulation, the suspension assembly enables an appreciable reduction in vertical coupling of all the disk vibration modes in comparison to a conventional suspension assembly. With a vertical offset amount of about 70 microns, an improvement in suspension performance is shown in a frequency range of 700 Hz to 2200 Hz in this embodiment. The simulated position error signal spectrum is an example for vibration modes in a 3.5 inch diameter disk having a thickness of 1.27 mm. Of course, the results described apply to this specific embodiment, and should not unduly limit the scope of the claims herein. Labels for the various disk modes are included in FIG. 13, using a naming convention common in the industry. The first placeholder represents the number of circumferential nodal lines, and the second represents the number of radial nodal lines. The static modes of the disk exist, in the dynamic case, as both forward and backward precession modes, thus the designations "F" and "B." So the 0,2F mode, for example, would be a forward precessing mode of the disk with 2 radial nodal lines, and the disk platter would appear to vibrate in a saddle shaped manner.

One of ordinary skill in the art would recognize many other variations, modifications, and alternatives. The above examples are merely illustrations, which should not unduly limit the scope of the claims herein. It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for operating a disk drive apparatus, the method comprising:
   applying a read/write head mounted on a load beam onto a disk to read a selected track in a periphery region of the disk;
   rotating the disk about a fixed axis, the rotating disk having at least one vibration mode to move the periphery region of the disk outside an x-y plane; and
   hinging the read/write head to travel at an angle to the x-y plane as the periphery region moves outside the x-y plane, the hinging not rolling the load beam relative to a plane defined by a surface of the disk;
   wherein a movement of the read/write head along the angle when the periphery region is outside the x-y plane reduces a length in an x-direction between the selected track and the read/write head.

2. The method of claim 1 wherein the angle is in a range of about 0° to about 2°.

3. The method of claim 1 wherein the hinging step includes hinging the read/write head using a plurality of non co-planar hinge means.

4. The method of claim 3 wherein the hinge means is selected from the group consisting of a spring and a spring extension.

5. The method of claim 3 wherein said hinging includes mounting a load beam via a plurality of hinges that are vertically offset one from another and are not rolled relative to a surface of said disk.

6. The method of claim 3 wherein said plurality of hinge means are rendered non co-planar by a first surface of a base plate in a location adjacent a first one of said hinge means being etched to lower said surface relative to a second surface of said base plate in a location adjacent a second one of said hinge means.

7. The method of claim 3 wherein a first one of said plurality of hinge means are parallel to one another and are vertically offset from each other.

8. The method of claim 7 wherein said hinge means are vertically offset by a first one of said hinge means being mounted to a top surface of a load beam to which said read/write head is mounted, and a second one of said hinge means being mounted to a bottom surface of said load beam.

9. The method of claim 1 wherein the hinging step includes supporting a load beam on which said read/write head is carried by a first hinge means and a second hinge means, said first hinge means having a step formed therein thereby vertically offsetting at least a portion of said first hinge means from a second hinge means.

10. The method of claim 1 wherein the hinging is performed by a first hinge and a second hinge, the first hinge being disposed both closer to said fixed axis and closer to a surface of said disk than the second hinge.

11. A method for operating a disk drive apparatus, the method comprising:

applying a read/write head mounted on a load beam onto a disk to read a selected track in a periphery region of the disk;

rotating the disk about a fixed axis, the rotating disk having at least one vibration mode to move the periphery region of the disk outside an x-y plane;

hinging the read/write head to travel at an angle to the x-y plane as the periphery region moves outside the x-y plane, the hinging not rolling the load beam relative to a plane defined by a surface of the disk; and following by the suspension assembly from a reference position to a second position a vertical movement of the movable disk, the suspension assembly being predisposed to move from the reference position to the second position by a vertical offset between a first spring extension and a second spring extension of the suspension assembly;

wherein a movement of the read/write head along the angle when the periphery region is outside the x-y plane reduces a length in an x-direction between the selected track and the read/write head than if the first and second spring extensions are disposed to be co-planar.

12. The method of claim 11 wherein the vertical offset is determined for a selected amount of attenuation of disk vertical coupling based on a head thickness, disk thickness, and disk diameter.

13. The method of claim 11 wherein a first hinge comprises the first spring extension, and a second hinge comprises the second spring extension.

14. The method of claim 11 wherein said vertical offset is created by at least one shim underneath at least one of said spring extensions.

15. The method of claim 11 wherein said first suspension spring extension is disposed both closer to said fixed axis and closer to a surface of said disk than the second suspension spring extension.

* * * * *